Figure 1A:
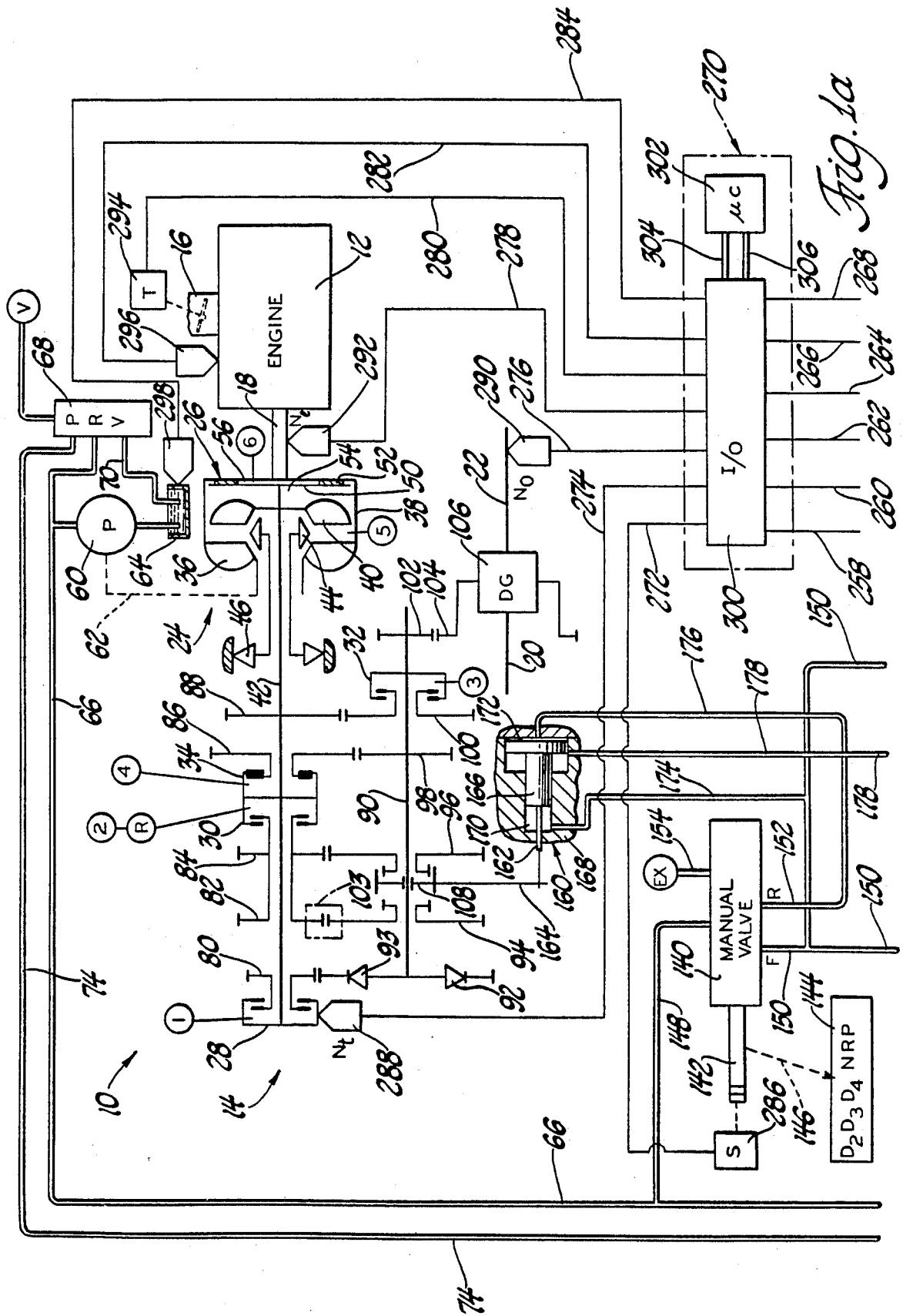

United States Patent [19]

Downs et al.

[11] Patent Number: 4,653,350

[45] Date of Patent: Mar. 31, 1987

[54] ADAPTIVE DIRECT PRESSURE SHIFT CONTROL FOR A MOTOR VEHICLE TRANSMISSION

[75] Inventors: Robert C. Downs, Ortonville; Larry T. Nitz, Troy; Joseph L. Wanamaker, Rochester, all of Mich.

[73] Assignee: General Motors Corporation, Detroit, Mich.

[21] Appl. No.: 802,677

[22] Filed: Nov. 29, 1985

[51] Int. Cl.[4] .................. B60K 17/12; B60K 20/16; G06F 15/50

[52] U.S. Cl. .................................. 74/864; 74/866; 364/424.1

[58] Field of Search .............. 364/424.1; 74/861–867

[56] References Cited

U.S. PATENT DOCUMENTS

| | | | |
|---|---|---|---|
| 4,220,058 | 9/1980 | Petzold | 74/866 |
| 4,283,970 | 8/1981 | Vukovich | 74/866 |
| 4,485,443 | 11/1984 | Knödler | 74/866 |

FOREIGN PATENT DOCUMENTS

| | | | |
|---|---|---|---|
| 2931744 | 2/1981 | Fed. Rep. of Germany | 74/867 |
| 2938268 | 4/1981 | Fed. Rep. of Germany | 74/866 |

*Primary Examiner*—Leslie Braun
*Assistant Examiner*—John Malcolm White
*Attorney, Agent, or Firm*—Mark A. Navarre

[57] ABSTRACT

An adaptive shift control system for regulating the operation of a fluid operated torque establishing device associated with a specified speed ratio in a motor vehicle automatic transmission. Shifting from a currently engaged speed ratio to the specified speed ratio includes a completion phase during which fluid is supplied to the torque establishing device in accordance with a predetermined pressure schedule to initiate and progressively increase the transmission of torque therethrough. The time required to complete a specified portion of the speed ratio progression is identified and compared to a reference time representative of the time required to complete the progression when the shift quality is not degraded. The predetermined pressure schedule is adjusted based on such comparison so as to adaptively compensate for sources of error which affect the increase of torque transmission through the torque establishing device during the completion phase and cause the shift quality to be degraded.

8 Claims, 20 Drawing Figures

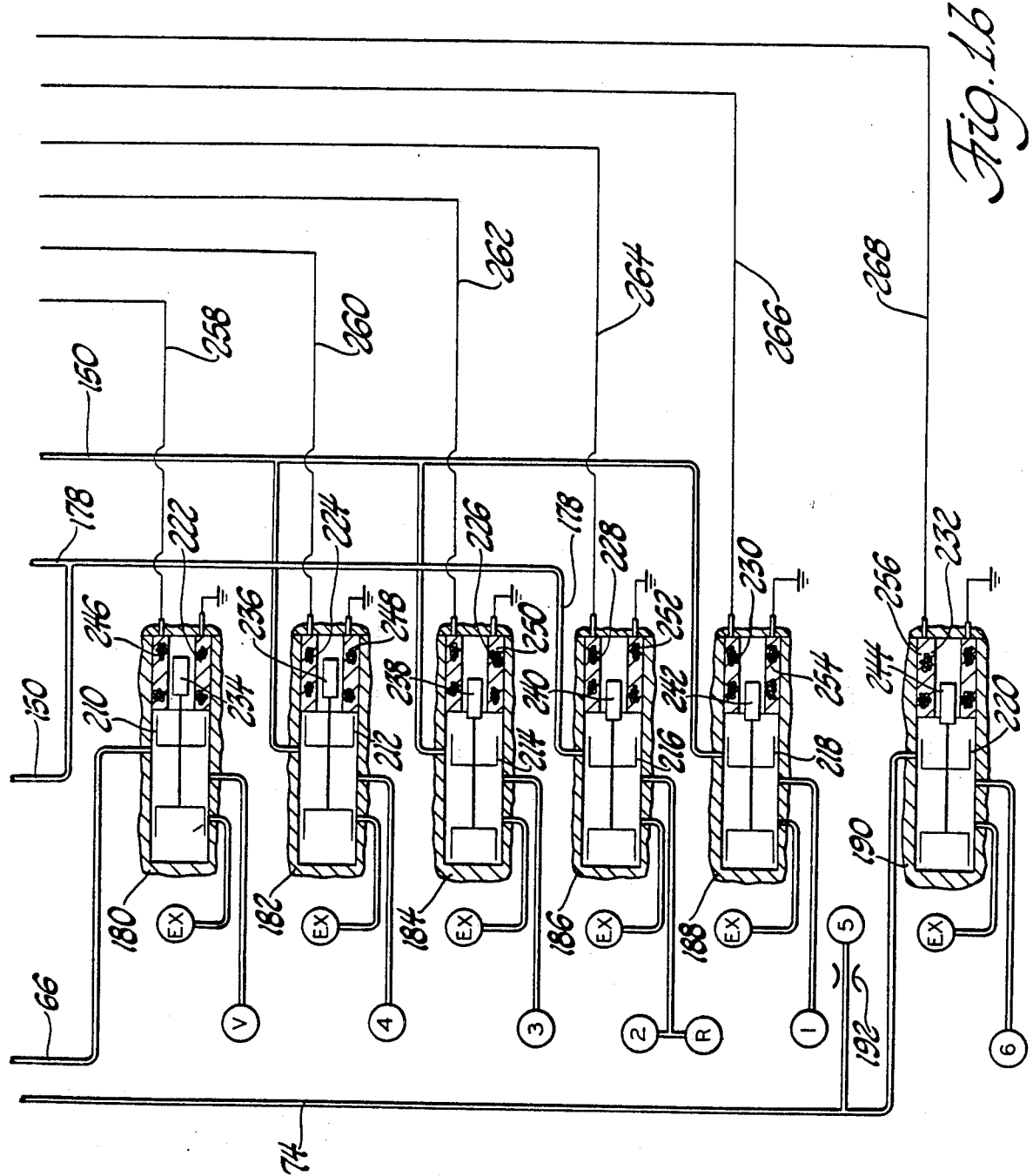

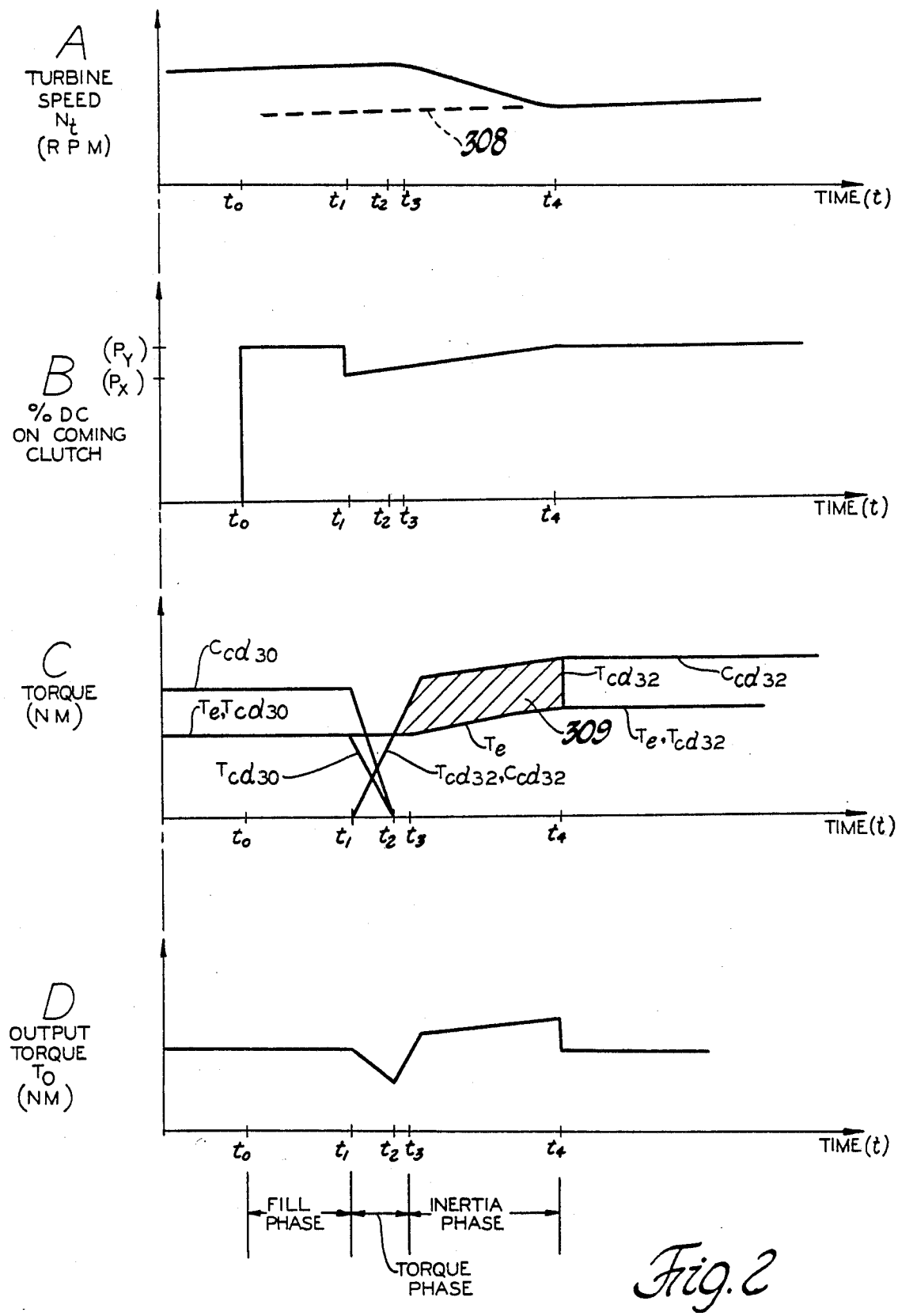

ADAPTIVE DIRECT PRESSURE SHIFT CONTROL FOR A MOTOR VEHICLE TRANSMISSION

This invention relates to direct pressure electronic control of a motor vehicle automatic transmission and more particularly to adaptive correction of performance deficiencies in the control due to vehicle-to-vehicle variability and wear.

BACKGROUND OF THE INVENTION

Motor vehicle transmissions generally include selectively engageable gear elements for providing two or more forward speed ratios through which engine output torque is applied to the vehicle drive wheels. In automatic transmissions, the gear elements which provide the various speed ratios are selectively activated through fluid operated torque establishing devices, such as clutches and brakes. The brake can be of the band or disk type; engineering personnel in the automotive art refer to disk type brakes in transmissions as clutches, clutching devices, or reaction clutches. Thus, shifting from one speed ratio to another generally involves releasing (disengaging) the clutching device associated with the current speed ratio and applying (engaging) the clutching device associated with the desired speed ratio. The clutching device to be released is referred to as the off-going clutch, while the clutching device to be applied is referred to as the on-coming clutching device. There is generally a slight overlap between the release and apply, and high quality shifts are only achieved when the release and apply are properly timed and executed.

Conventionally, the control of shifting in an automatic transmission is performed with hydraulic logic and servo elements responsive to various system parameters such as vehicle speed and throttle position. Fluid pressure signals representative of the various system parameters are processed to determine when a shift is in order, and spring elements and fluid orifices within the servo elements determine the timing calibration for the release and apply of the respective clutching devices.

To overcome certain disadvantages of hydraulic control, it has been proposed to electronically perform at least some of the transmission control functions. For example, it has been suggested to electronically determine the desired speed ratio based on measured system parameters, and directly control the supply of fluid to the respective clutching elements to effect shifting from one speed ratio to another. Among the advantages of electronic control are reduced hardware complexity, increased reliability and greater control flexibility. An example of an electronic control system for an automatic transmission is given in the U.S. Pat. No. to Marlow 3,688,607 issued Sept. 5, 1972, which patent is assigned to the assignee of the present invention.

The U.S. Pat. No 3,688,607 referred to above discloses a closed loop control where the speed rate of change of a specified transmission element is made to conform with a reference rate. The present invention, on the other hand, is directed to an open loop control. In open loop control, the fluid valves are controlled in accordance with a predetermined schedule to effect apply and release of the various transmission clutching devices, and the control is not changed in the course of a shift in accordance with a measure of a controlled parameter. Such pure open loop control of the clutching devices is acceptable so long as there are no significant variations in the engine and transmission operating characteristics, and no significant assembly tolerances. However, engine and transmission operating characteristics do change with time, and the production assembly tolerances may result in significant vehicle-to-vehicle variability. As a result, control schedules that produce acceptable ratio shifting in one vehicle may produce unacceptable ratio shifting in another vehicle.

SUMMARY OF THE INVENTION

The primary object of the present invention is to provide an improved open loop direct pressure shift control system, wherein the control is adaptively compensated in the course of its operation for variations in the operating characteristics of the engine and transmission. In its basic form, the control system directs the supply of fluid pressure to the transmission clutching devices in accordance with empirically derived schedules as a function of operator demand and various vehicle parameters. In the course of shifting from one speed ratio to another, certain operating parameters of the transmission are monitored as an indication of the shift quality. If the monitored parameters indicate that a particular shift did not progress in an optimum manner, the controller develops corrections for the empirically derived schedules involved in the shift so that when the shift is repeated at a later point, it will be performed in a more nearly optimum manner.

The present invention addresses the completion phase of ratio shifting. The completion phase follows the fill or preparation phase in which the on-coming clutching device is readied to transmit torque. In the completion phase, the transmission of torque through the on-coming clutching device is initiated and progressively increased by supplying fluid thereto in accordance with a predetermined pressure schedule. The completion phase comprises torque and inertia phases as in conventional usage, the torque phase being defined as the portion of the completion phase during which there is an exchange of torque between the off-going and on-coming clutches but no speed change, and the inertia phase being defined as the portion of the completion phase during which the speed change is effected. The predetermined pressure schedules are empirically derived to provide optimum shift quality, and may be different for each clutching device. However, various sources of error affect the pressure of the supplied fluid and the required fluid volume. In this event, the predetermined pressure schedules are incorrect, and the shift quality may be degraded.

Broadly, the adaptive control of this invention adjusts the predetermined pressure schedules by detecting the time required to effect the speed change (or a specified portion thereof), comparing the detected time to a reference time, and developing a correction for the scheduled pressure if necessary. The corrections are developed and applied in a novel manner designed to maximize the speed of convergence while minimizing the converged error.

A co-pending patent application D-9329 is directed to an adaptive control of the fill or preparation phase of the speed ratio shift. That control is also described herein.

IN THE DRAWINGS

FIGS. 1a and 1b schematially depict a computer based electronic transmission control system according to the teachings of this invention.

FIG. 2 graphically depicts various parameters of the engine and transmission in the course of a typical upshift.

FIGS. 3–6 graphically depict certain of the parameters shown in FIG. 2 for upshifts in which the stored fill time and pressure schedules are in error.

Figure 7:
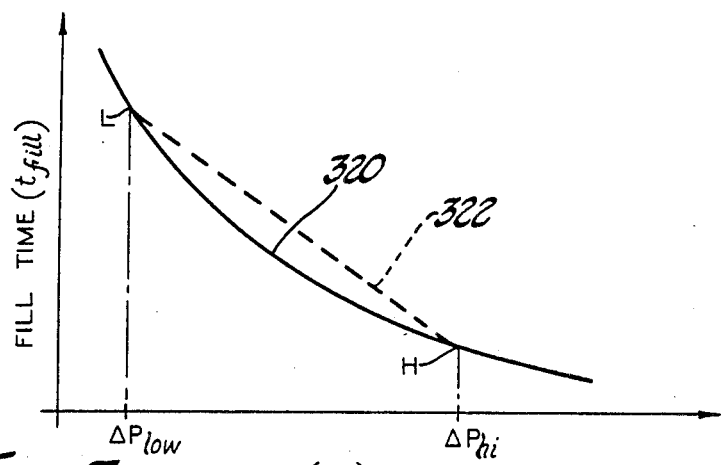
Figure 8:
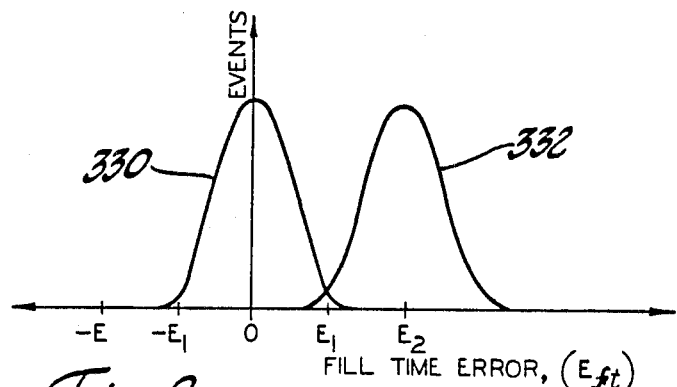
Figure 9:
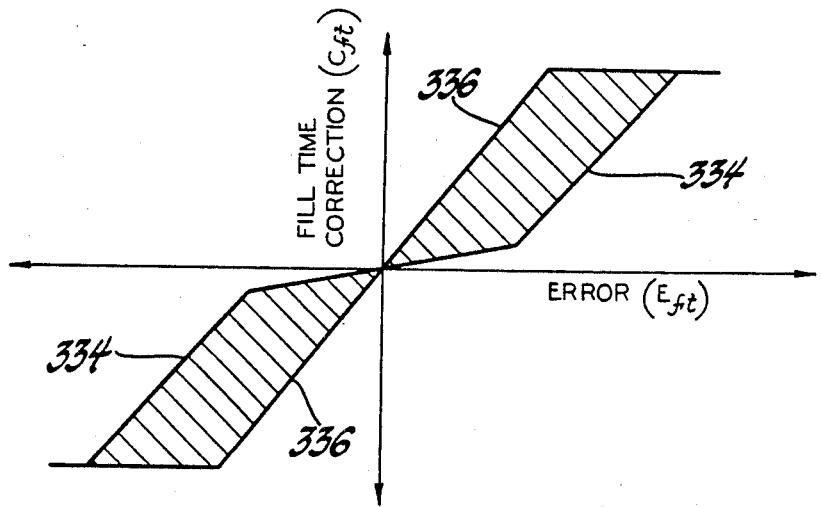
Figure 10:
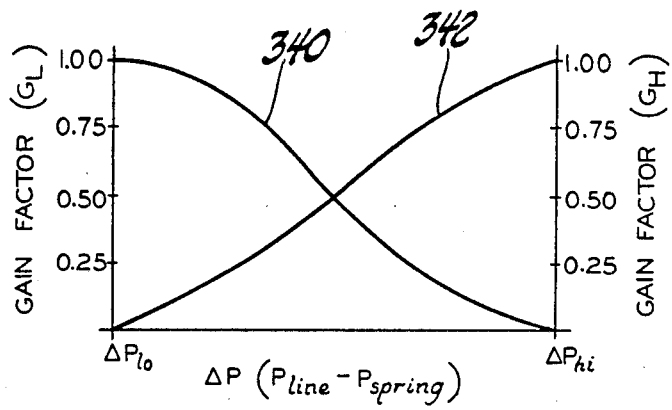

FIGS. 7–10 graphically depict adaptive compensation of the empirically determined fill time. FIG. 7 depicts the stored fill time ($t_{fill}$) vs. working pressure $\Delta P$ relationship; FIG. 8 depicts typical fill time error distributions for converged and non-converged systems; FIG. 9 depicts the scheduling of fill time corrections; and FIG. 10 depicts the application of the corrections to the stored $t_{fill}$ vs. $\Delta P$ relationship of FIG. 7.

Figure 11:
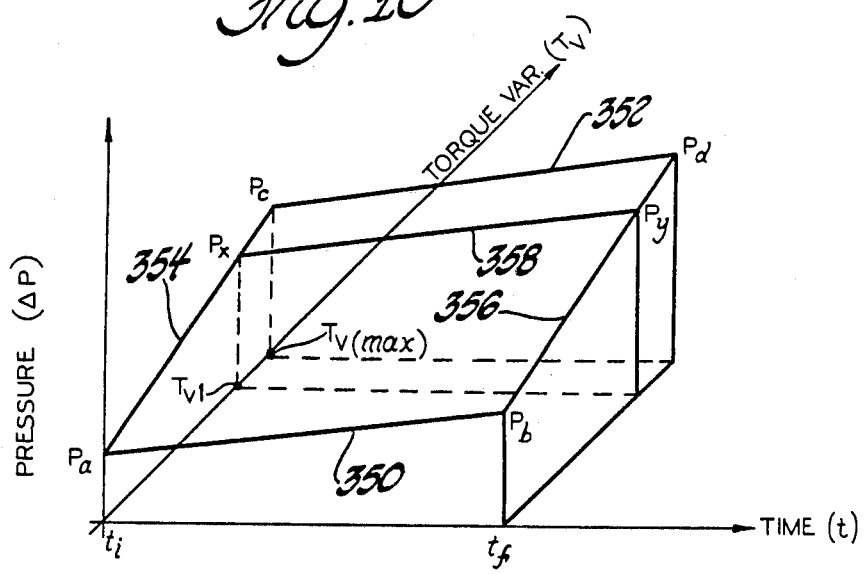
Figure 12:
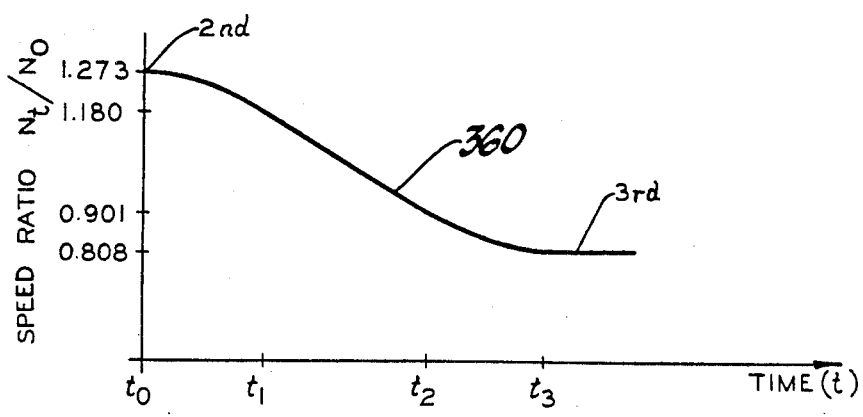

FIGS. 11–12 graphically depict adaptive compensation of the empirically determined pressure schedules. FIG. 11 depicts the stored pressure $\Delta P$ vs. torque variable ($T_v$) vs. time (t) relationship; and FIG. 12 depicts the measurement of a predefined inertia phase interval.

Figure 13:
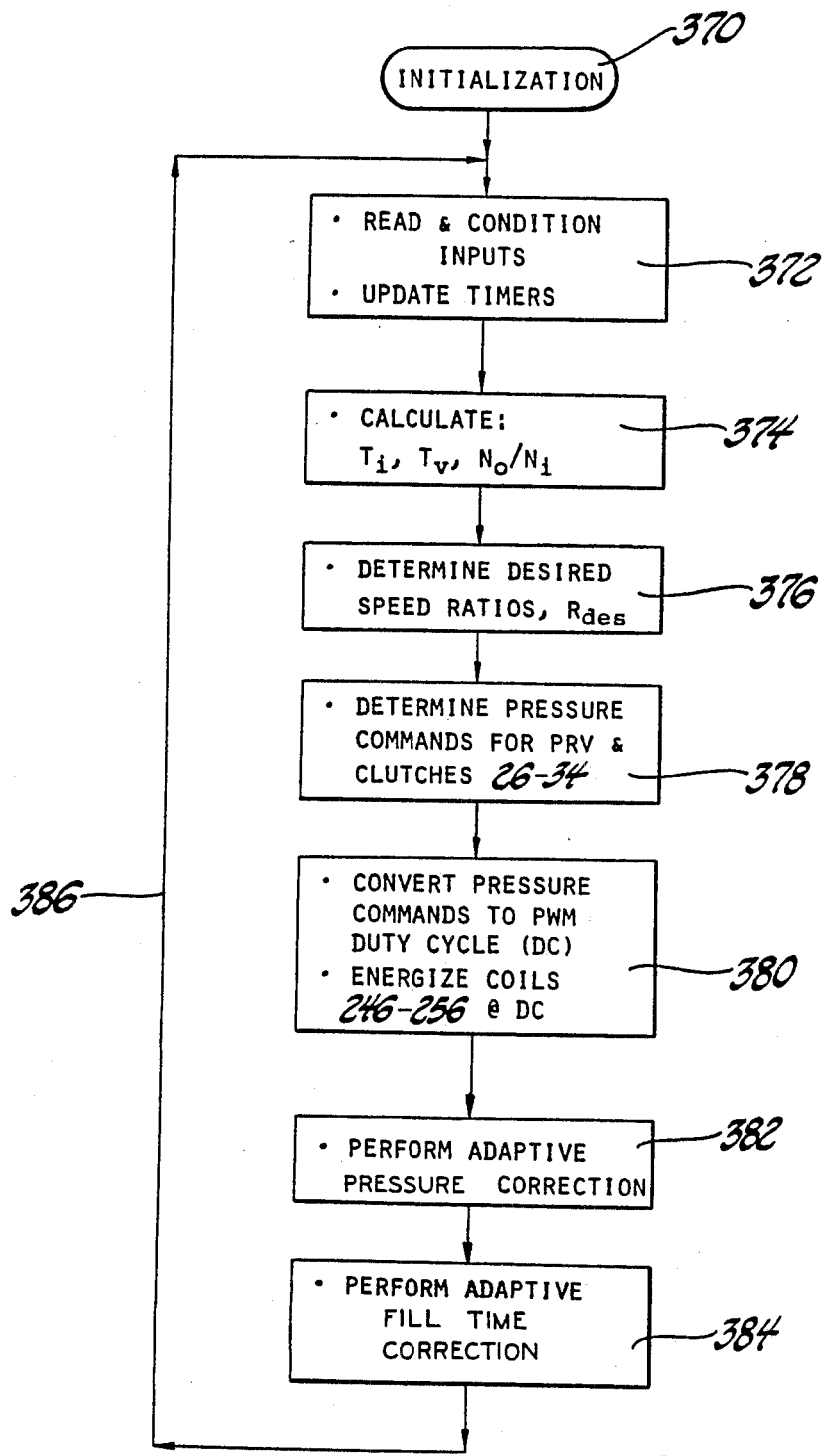
Figure 14:
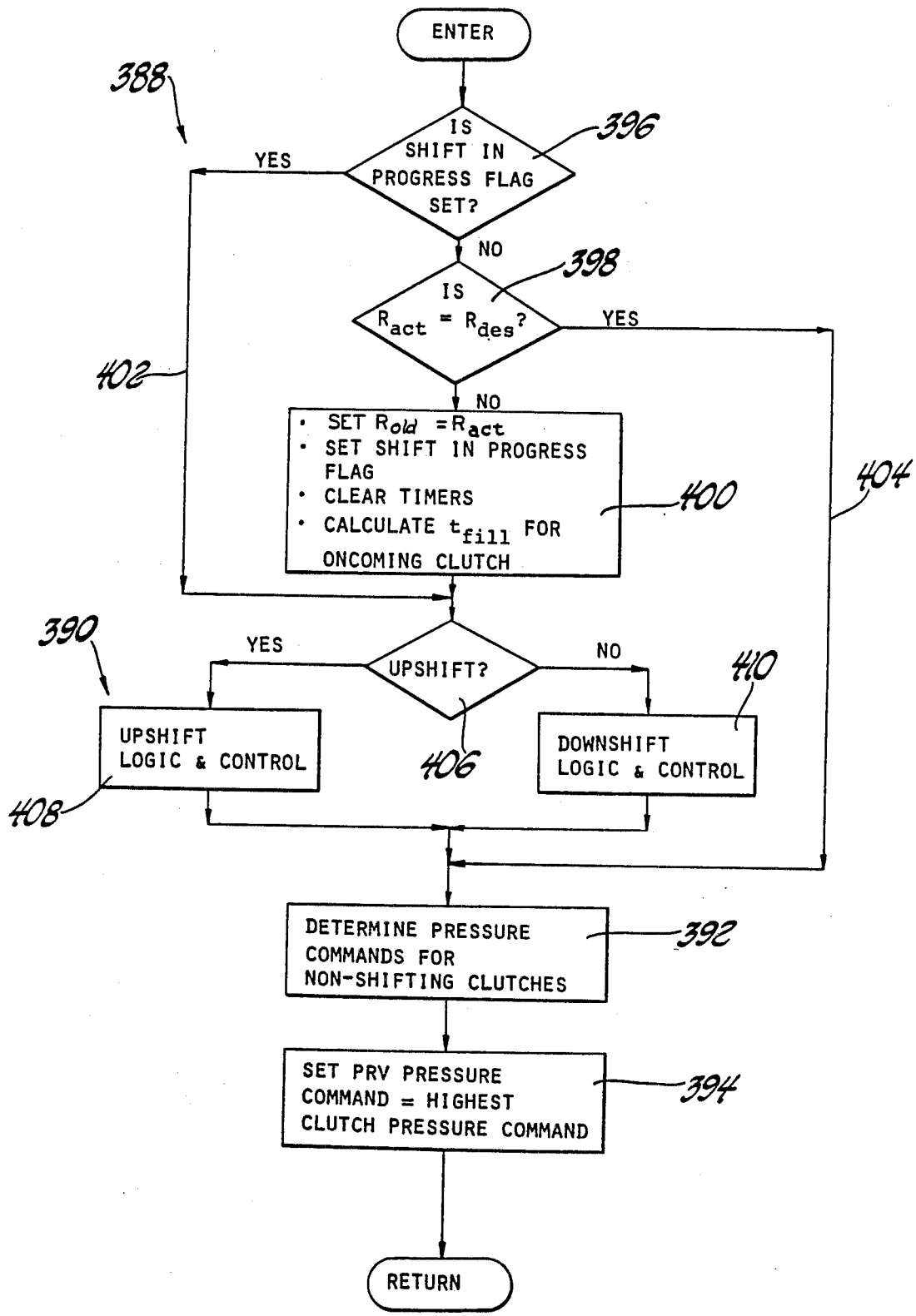
Figure 15:
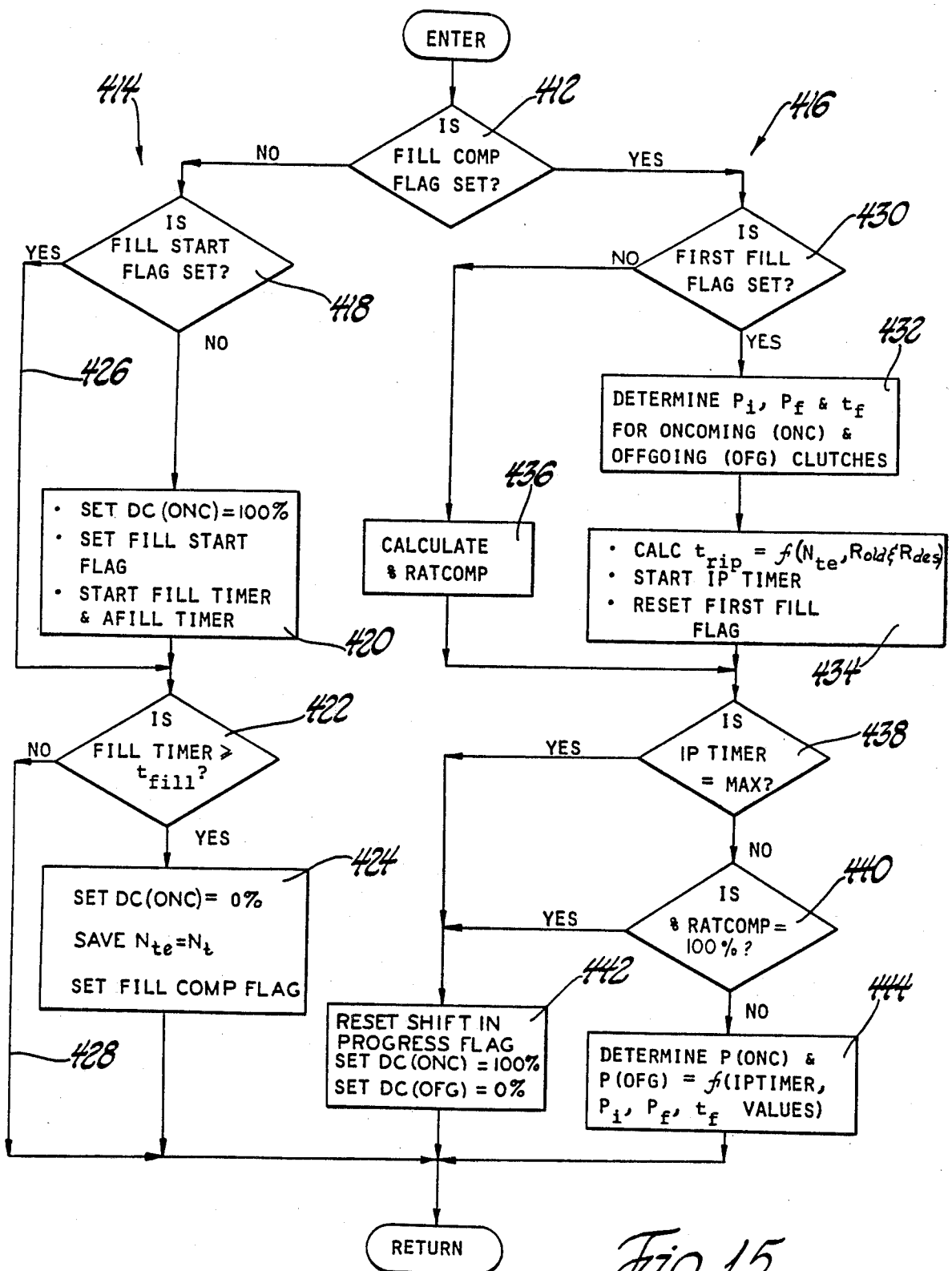
Figure 16A:
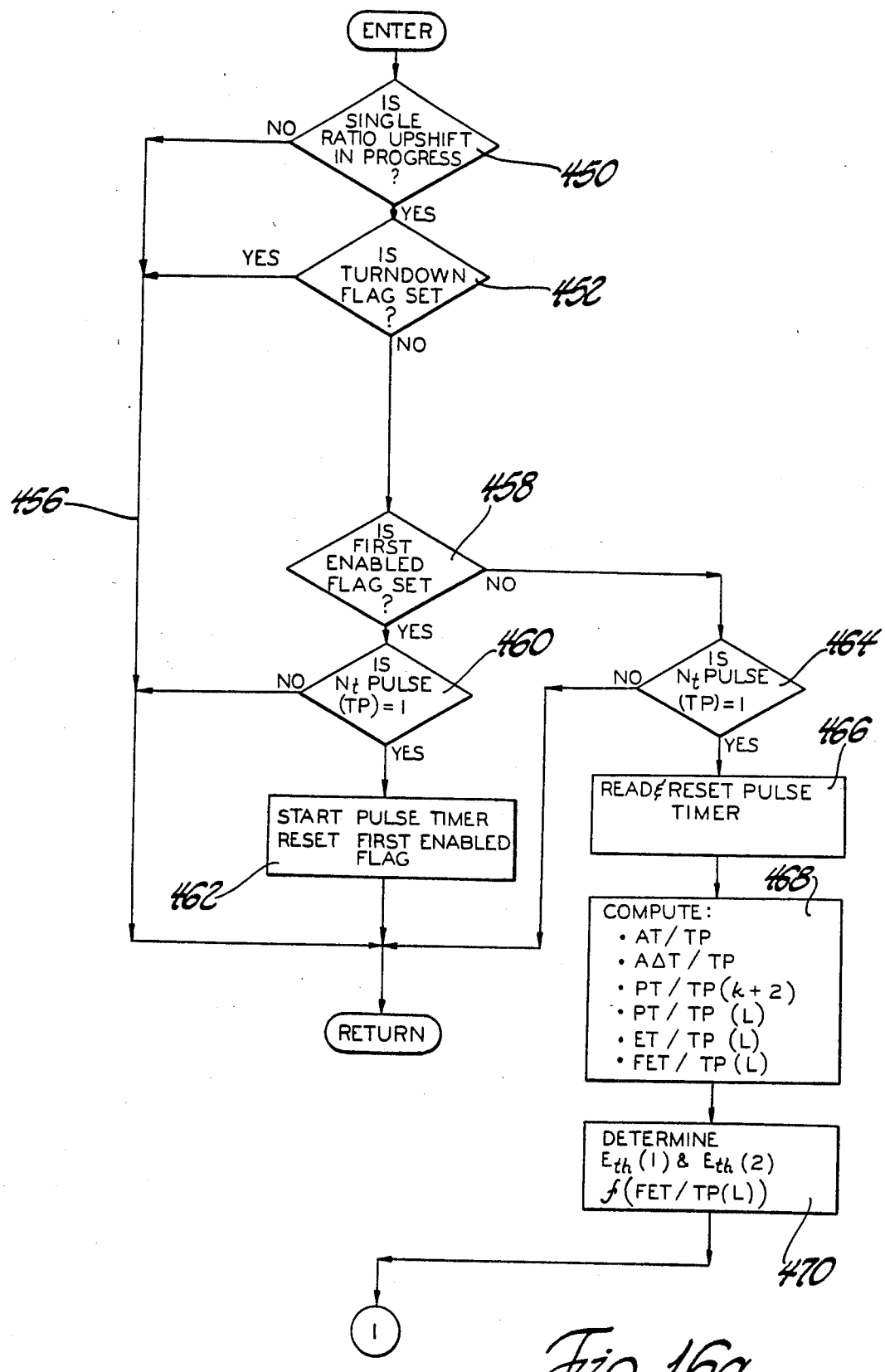
Figure 16B:
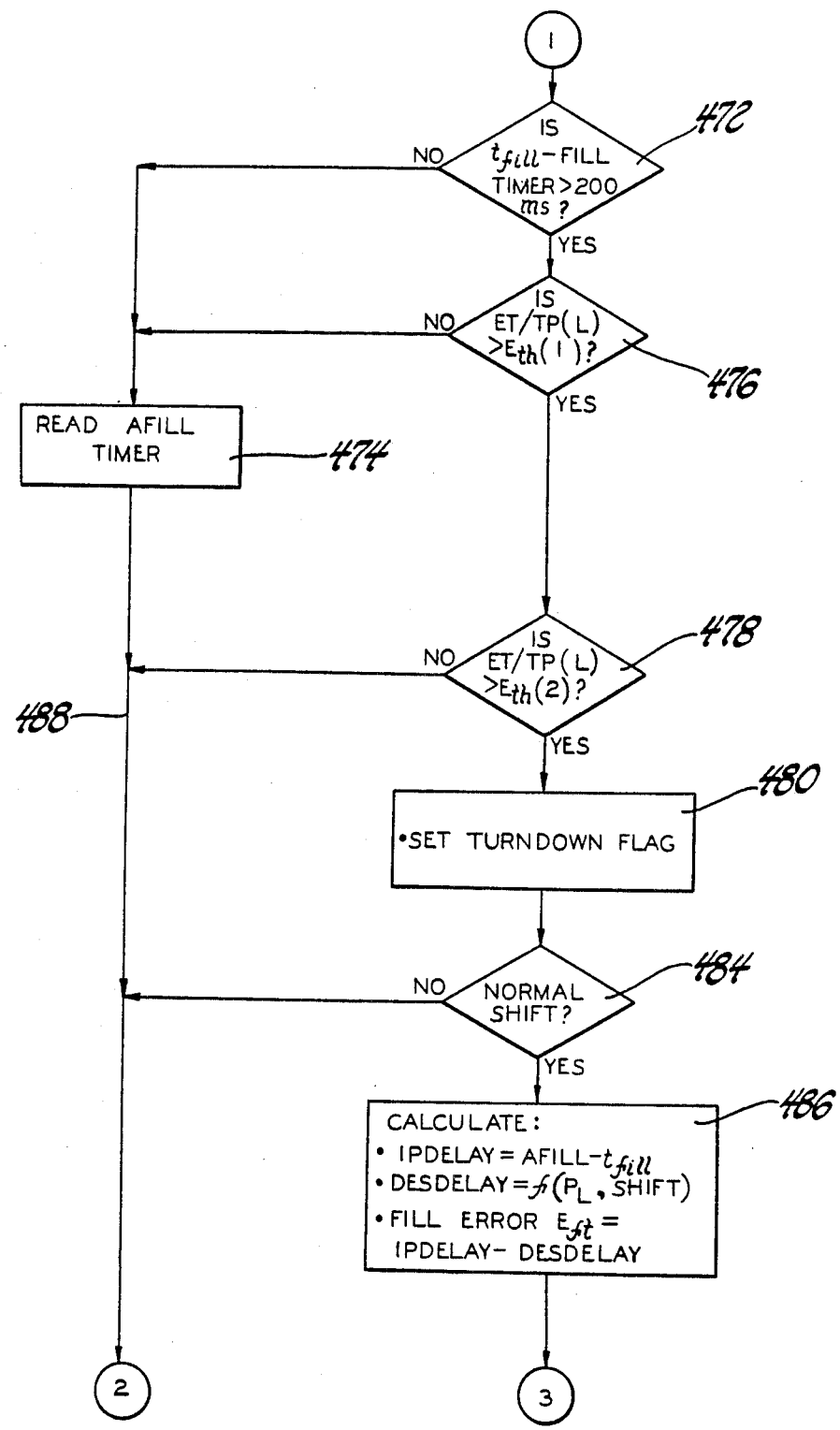
Figure 16C:
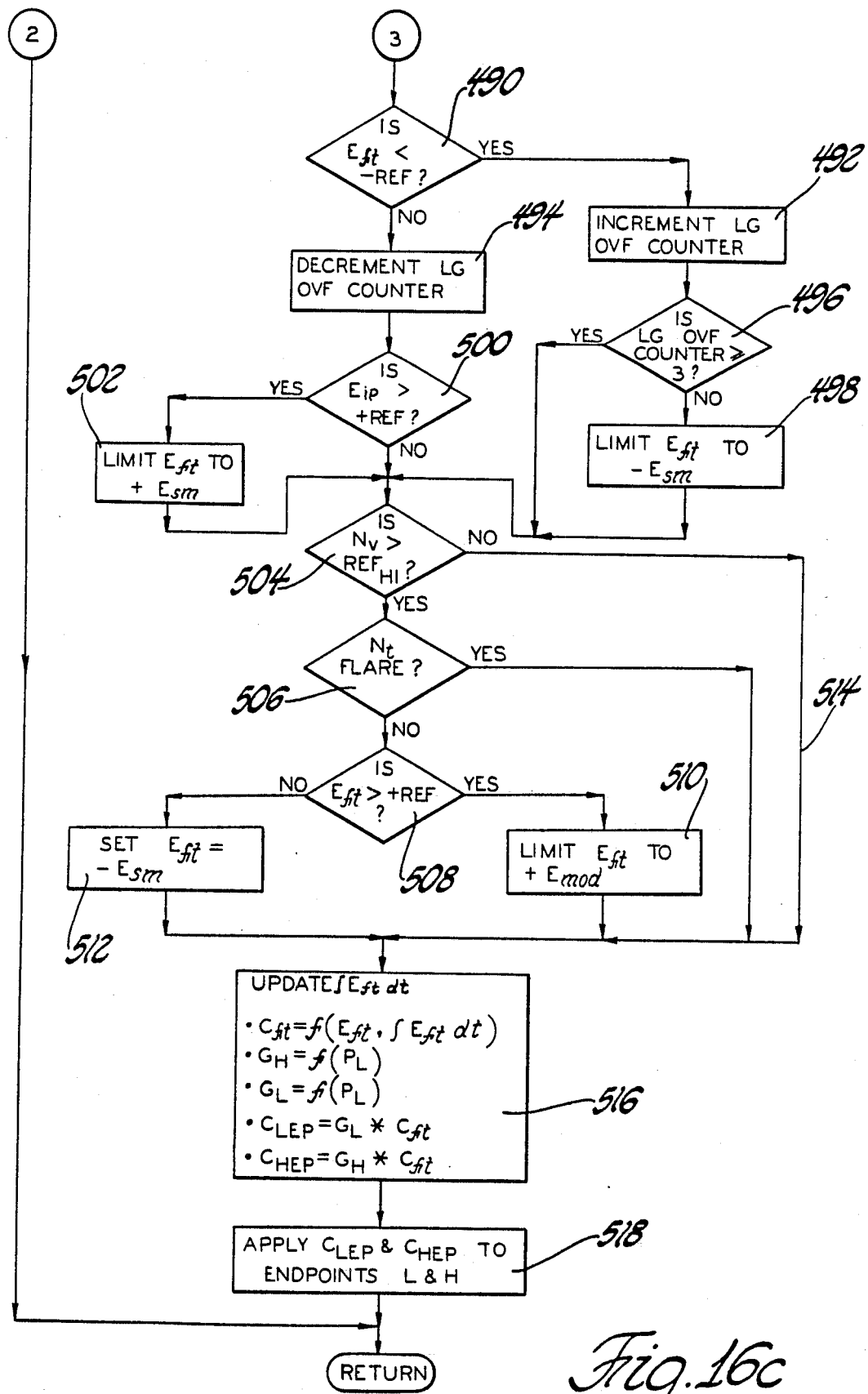
Figure 17:
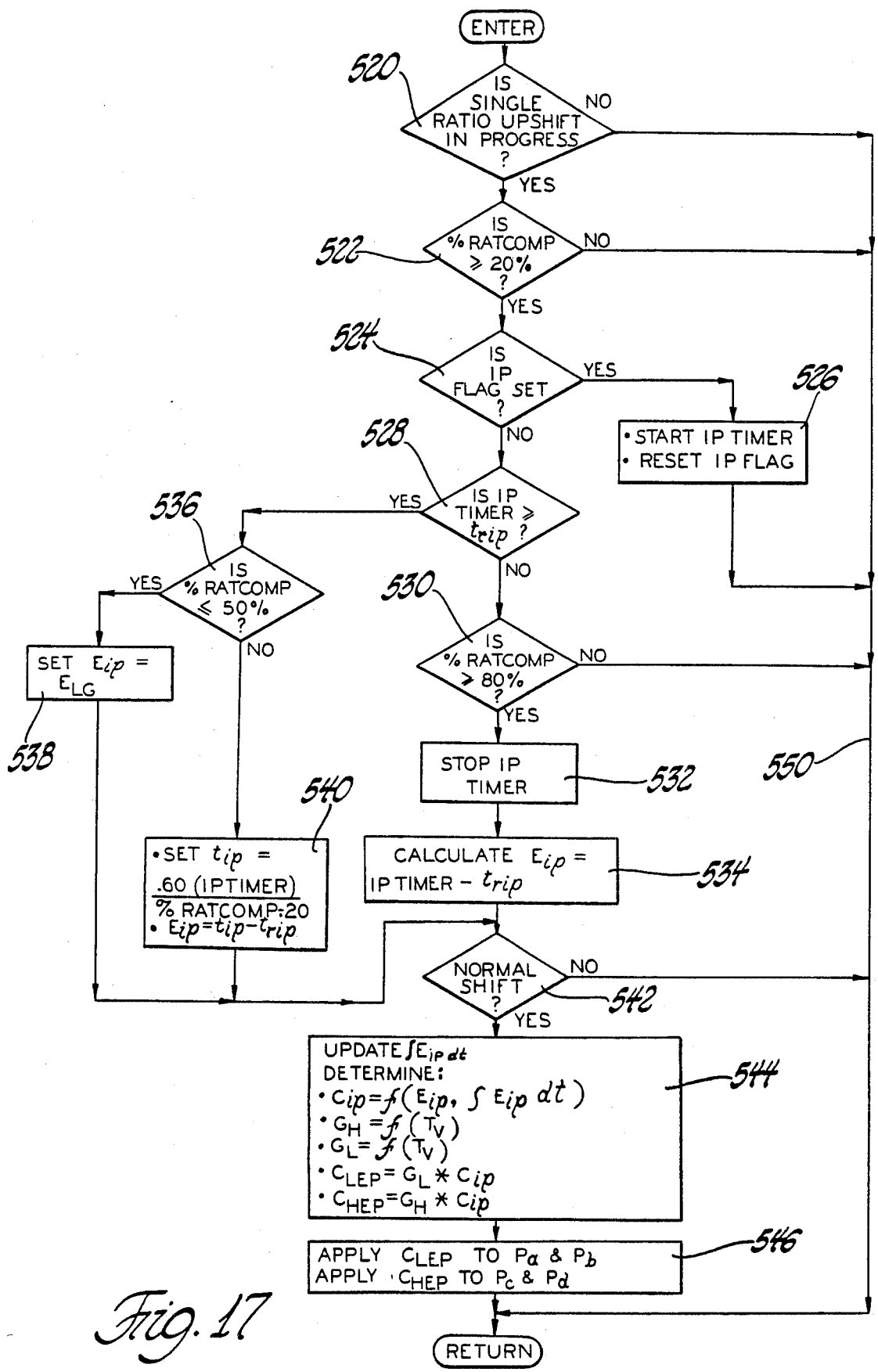

FIGS. 13–17 depict flow diagrams representative of suitable program instructions executed by the computer based controller of FIG. 1 for carrying out the control functions of this invention. FIG. 13 depicts a main loop program; FIGS. 14–15 depict pressure control algorithms for a typical power-on upshift; FIGS. 16a–16c depict the algorithm for adaptive fill time correction; and FIG. 17 depicts the algorithm for adaptive pressure correction.

Referring now to the drawings, and more particularly to FIGS. 1a and 1b, the reference numeral 10 generally designates a motor vehicle drivetrain including an engine 12 and a parallel shaft transmission 14 having a reverse speed ratio and four forward speed ratios. Engine 12 includes a throttle mechanism 16 mechanically connected to an operator manipulated device such as an accelerator pedal (not shown) for regulating engine output torque, such torque being applied to the transmission 14 through the engine output shaft 18. The transmission 14 transmits engine output torque to a pair of drive axles 20 and 22 through a torque converter 24 and one or more of the fluid operated clutching devices 26–34, such clutching devices being applied or released according to a predetermined schedule for establishing the desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the shaft 42. A stator member 44 redirects the fluid which couples the impeller 36 to the turbine 40, the stator being connected through a one-way device 46 to the housing of transmission 14. The torque converter 24 also includes a clutching device 26 comprising a clutch plate 50 secured to the shaft 42. The clutch plate 50 has a friction surface 52 formed thereon adaptable to be engaged with the inner surface of the input shell 38 to form a direct mechanical drive between the engine output shaft 18 and the transmission shaft 42. The clutch plate 50 divides the space between input shell 38 and the turbine 40 into two fluid chambers: an apply chamber 54 and a release chamber 56. When the fluid pressure in the apply chamber 54 exceeds that in the release chamber 56, the friction surface 52 of clutch plate 50 is moved into engagement with the input shell 38 as shown in FIG. 1, thereby engaging the clutching device 26 to provide a mechanical drive connection in parallel with the torque converter 24. In such case, there is no slippage between the impeller 36 and the turbine 40. When the fluid pressure in the release chamber 56 exceeds that in the apply chamber 54, the friction surface 52 of the clutch plate 50 is moved out of engagement with the input shell 38 thereby uncoupling such mechanical drive connection and permitting slippage between the impeller 36 and the turbine 40. The circled numeral 5 represents a fluid connection to the apply chamber 54 and the circled numeral 6 represents a fluid connection to the release chamber 56.

A positive displacement hydraulic pump 60 is mechanically driven by the engine output shaft 18 through the input shell 38 and impeller 36 as indicated by the broken line 62. Pump 60 receives hydraulic fluid at low pressure from the fluid reservoir 64 and supplies pressurized fluid to the transmission control elements via output line 66. A pressure regulator valve (PRV) 68 is connected to the pump output line 66 and serves to regulate the fluid pressure (hereinafter referred to as line pressure) in line 66 by returning a controlled portion of the fluid therein to reservoir 64 via the line 70. In addition, pressure regulator valve 68 supplies fluid pressure for the torque converter 24 via line 74. While the pump and pressure regulator valve designs are not critical to the present invention, a representative pump is disclosed in the U.S. Pat. No. 4,342,545 to Schuster issued Aug. 3, 1982, and a representative pressure regulator valve is disclosed in the U.S. Pat. 4,283,970 to Vukovich issued Aug. 18, 1981 such patents being assigned to the assignee of the present invention.

The transmission shaft 42 and a further transmission shaft 90 each have a plurality of gear elements rotatably supported thereon. The gear elements 80–88 are supported on shaft 42 and the gear elements 92–102 are supported on shaft 90. The gear element 88 is rigidly connected to the shaft 42, and the gear elements 98 and 102 are rigidly connected to the shaft 90. Gear element 92 is connected to the shaft 90 via a freewheeler or one-way device 93. The gear elements 80, 84, 86 and 88 are maintained in meshing engagement with the gear elements 92, 96, 98 and 100, respectively, and the gear element 82 is coupled to the gear element 94 through a reverse idler gear 103. The shaft 90, in turn, is coupled to the drive axles 20 and 22 through gear elements 102 and 104 and a conventional differential gear set (DG) 106.

A dog clutch 108 is splined on the shaft 90 so as to be axially slidable thereon, and serves to rigidly connect the shaft 90 either to the gear element 96 (as shown) or the gear element 94. A forward speed relation between the gear element 84 and shaft 90 is established when dog clutch 108 connects the shaft 90 to gear element 96, and a reverse speed relation between the gear element 82 and shaft 90 is established when the dog clutch 108 connects the shaft 90 to the gear element 94.

The clutching devices 28–34 each comprise an input member rigidly connected to a transmission shaft 42 or 90, and an output member rigidly connected to one or more gear elements such that engagement of a clutching device couples the respective gear element and shaft to effect a driving connection between the shafts 42 and 90. The clutching device 28 couples the shaft 42 to the gear element 80; the clutching device 30 couples the shaft 42 to the gear elements 82 and 84; the clutching device 32 couples the shaft 90 to the gear element 100; and the clutching device 34 couples the shaft 42 to the gear element 86. Each of the clutching devices 28–34 is biased toward a disengaged state by a return spring (not shown). Engagement of the clutching device is effected by supplying fluid pressure to an apply chamber thereof. The resulting torque capacity of the clutching device is a function of the applied pressure less the return spring pressure, hereinafter referred to as the working pressure $\Delta P$. The circled numeral 1 represents a fluid passage for supplying pressurized fluid to the apply chamber of clutching device 28; the circled numeral 2 and letter R represent a fluid passage for supplying pressurized fluid to the apply chamber of the clutching device 30; the circled numeral 3 represents a fluid passage for supplying pressurized fluid to the apply chamber of the clutching device 32; and the circled numeral 4 represents a fluid passage for directing pressurized fluid to the apply chamber of the clutching device 34.

The various gear elements 80–88 and 92–100 are relatively sized such that engagement of first, second, third and fourth forward speed ratios are effected by engaging the clutching devices 28, 30, 32 and 34, respectively, it being understood that the dog clutch 108 must be in the position depicted in FIG. 1 to obtain a forward speed ratio. A neutral speed ratio or an effective disconnection of the drive axles 20 and 22 from the engine output shaft 18 is effected by maintaining all of the clutching devices 28–34 in a released condition. The speed ratios defined by the various gear element pairs are generally characterized by the ratio of the turbine speed $N_t$ to output speed $N_o$. Representative $N_t/N_o$ ratios for transmission 14 are as follows:

| First - 2.368 | Second - 1.273 |
|---|---|
| Third - 0.808 | Fourth - 0.585 |
| Reverse - 1.880 | |

As indicated above, shifting from a current forward speed ratio to a desired forward speed ratio requires that the clutching device associated with the current speed ratio (off-going) be disengaged and the clutching device associated with the desired speed ratio (on-coming) be engaged. For example, a shift from the first forward speed ratio to the second forward speed ratio involves disengagement of the clutching device 28 and engagement of the clutching device 30. As explained below, the timing of such disengagement and engagement is critical to the attainment of high quality shifting, and this invention is directed primarily to a control system for supplying fluid pressure to the various clutching devices 28–34 to achieve consistent high quality shifting.

The fluid control elements of the transmission 14 include a manual valve 140, a directional servo 160 and a plurality of electrically operated fluid valves 180–190. The manual valve 140 operates in response to operator demand and serves, in conjunction with directional servo 160, to direct regulated line pressure to the appropriate fluid valves 182–188. The fluid valves 182–188, in turn, are individually controlled to direct fluid pressure to the clutching devices 28–34. The fluid valve 180 is controlled to direct fluid pressure from the pump output line 66 to the pressure regulator valve 68, and the fluid valve 190 is controlled to direct fluid pressure from the line 74 to the clutching device 26 of torque converter 24. The directional servo 160 operates in response to the condition of the manual valve 140 and serves to properly position the dog clutch 108.

The manual valve 140 includes a shaft 142 for receiving axial mechanical input from the operator of the motor vehicle in relation to the speed range the operator desires. The shaft 142 is also connected to an indicator mechanism 144 through a suitable mechanical linkage as indicated generally by the broken line 146. Fluid pressure from the pump output line 66 is applied as an input to the manual valve 140 via the line 148 and the valve outputs include a forward (F) output line 150 for supplying fluid pressure for engaging forward speed ratios and a reverse (R) output line 152 for supplying fluid pressure for engaging the reverse speed ratio. Thus, when the shaft 142 of manual valve 140 is moved to the D4, D3, or D2 positions shown on the indicator mechanism 144, line pressure from the line 148 is directed to the forward (F) output line 150. When the shaft 142 is in the R position shown on the indicator mechanism 144, line pressure from the line 148 is directed to the reverse (R) output line 152. When the shaft 142 of manual valve 140 is in the N (neutral) or P (park) positions, the input line 148 is isolated, and the forward and reverse output lines 150 and 152 are connected to an exhaust line 154 which is adapted to return any fluid therein to the fluid reservoir 64.

The directional servo 160 is a fluid operated device and includes an output shaft 162 connected to a shift fork 164 for axially shifting the dog clutch 108 on shaft 90 to selectively enable either forward or reverse speed ratios. The output shaft 162 is connected to a piston 166 axially movable within the servo housing 168. The axial position of the piston 166 within the housing 168 is determined according to the fluid pressures supplied to the chambers 170 and 172. The forward output line 150 of manual valve 140 is connected via line 174 to the chamber 170 and the reverse output line 152 of manual valve 140 is connected via the line 176 to the chamber 172. When the shaft 142 of the manual valve 140 is in a forward range position, the fluid pressure in the chamber 170 urges piston 166 rightward as viewed in FIG. 1 to engage the dog clutch 108 with the gear element 96 for enabling engagement of a forward speed ratio. When the shaft 142 of the manual valve 140 is moved to the R position, the fluid pressure in chamber 172 urges piston 166 leftward as viewed in FIG. 1 to engage the dog clutch 108 with the gear element 94 for enabling engagement of the reverse speed ratio. In each case, it will be remembered that the actual engagement of the second or reverse speed ratio is not effected until engagement of the clutching device 30.

The directional servo 160 also operates as a fluid valve for enabling the reverse speed ratio. To this end, the directional servo 160 includes an output line 178 connected to the electrically operated fluid valve 186. When the operator selects a forward speed ratio and the piston 166 of directional servo 160 is in the position depicted in FIG. 1, the passage between lines 176 and 178 is cut off; when the operator selects the reverse gear ratio, the passage between the lines 176 and 178 is open.

The electrically operated fluid valves 180-190 each receive fluid pressure at an input passage thereof from the pump 60, and are individually controlled to direct fluid pressure to the pressure regulator valve 68 or respective clutching devices 26-34. The fluid valve 180 receives line pressure directly from pump output line 66, and is controlled to direct a variable amount of such pressure to the pressure regulator valve 68 as indicated by the circled letter V. The fluid valves 182, 186 and 188 receive fluid pressure from the forward output line 150 of manual valve 140, and are controlled to direct variable amounts of such pressure to the clutching devices 34, 32 and 28 as indicated by the circled numerals 4, 3 and 1, respectively. The fluid valve 186 receives fluid pressure from the forward output line 150 and the directional servo output line 178, and is controlled to direct a variable amount of such pressure to the clutching device 30 as indicated by the circled numeral 2 and the circled letter R. The fluid valve 190 receives fluid pressure from line 74 of pressure regulator valve 68, and is controlled to direct a variable amount of such pressure to the release chamber 56 of the clutching device 26 as indicated by the circled numeral 6. The apply chamber 54 of the clutching device 26 is supplied with fluid pressure from the output line 74 via the orifice 192 as indicated by the circled numeral 5.

Each of the fluid valves 180-190 includes a spool element 210-220, axially movable within the respective valve body for directing fluid flow between input and output passages. When a respective spool element 210-220 is in the rightmost position as viewed in FIG. 1, the input and output passages are connected. Each of the fluid valves 180-190 includes an exhaust passage as indicated by the circled letters EX, such passage serving to drain fluid from the respective clutching device when the spool element is shifted to the leftmost position as viewed in FIG. 1. In FIG. 1, the spool elements 210 and 212 of fluid valves 180 and 182 are shown in the rightmost position connecting the respective input and output lines, while the spool elements 214, 216, 218 and 220 of the fluid valves 184, 186, 188 and 190 are shown in the leftmost position connecting the respective output and exhaust lines. Each of the fluid valves 180-190 includes a solenoid 222-232 for controlling the position of its spool element 210-220. Each such solenoid 222-232 comprises a plunger 234-244 connected to the respective spool element 210-220 and a solenoid coil 246-256 surrounding the respective plunger. One terminal of each such solenoid coil 246-256 is connected to ground potential as shown, and the other terminal is connected to an output line 258-268 of a control unit 270 which governs the solenoid coil energization. As set forth hereinafter, the control unit 270 pulse-width-modulates the solenoid coils 246-256 according to a predetermined control algorithm to regulate the fluid pressure supplied to the pressure regulator 68 and the clutching devices 26-34, the duty cycle of such modulation being determined in relation to the desired magnitude of the supplied pressures.

While the fluid valves 180-190 have been illustrated as spool valves, other types of valves could be substituted therefor. By way of example, valves of the ball and seat type could be used. In general terms, the fluid valves 180-190 may be mechanized with any three-port pulse-width-modulated valving arrangement.

Input signals for the control unit 270 are provided on the input lines 272-284. A position sensor (S) 286 responsive to movement of the manual valve shaft 142 provides an input signal to the control unit 270 via line 272. Speed transducers 288, 290 and 292 sense the rotational velocity of various rotary members within the transmission 14 and supply speed signals in accordance therewith to the control unit 270 via lines 274, 276, and 278, respectively. The speed transducer 288 senses the velocity of the transmission shaft 42 and therefore the turbine or transmission input speed $N_t$; the speed transducer 290 senses the velocity of the drive axle 22 and therefore the transmission output speed $N_o$; and the speed transducer 292 senses the velocity of the engine output shaft 18 and therefore the engine speed $N_e$. The position transducer 294 is responsive to the position of the engine throttle 16 and provides an electrical signal in accordance therewith to control unit 270 via line 280. A pressure transducer 296 senses the manifold absolute pressure (MAP) of the engine 12 and provides an electrical signal to the control unit 270 in accordance therewith via line 282. A temperature sensor 298 senses the temperature of the oil in the transmission fluid reservoir 64 and provides an electrical signal in accordance therewith to control unit 270 via line 284.

The control unit 270 responds to the input signals on input lines 272-284 according to a predetermined control algorithm as set forth herein, for controlling the energization of the fluid valve solenoid coils 246–256 via output lines 258–268. As such, the control unit 270 includes an input/output (I/O) device 300 for receiving the input signals and outputting the various pulse-width-modulation signals, and a microcomputer 302 which communicates with the I/O device 300 via an address-and-control bus 304 and a bidirectional data bus 306. Flow diagrams representing suitable program instructions for developing the pulse-width-modulation outputs in accordance with the teachings of this invention are depicted in FIGS. 13–17.

As indicated above, every shift from one speed ratio to another involves disengagement of an off-going clutching device and engagement of an on-coming clutching device. Each shift includes a fill phase during which the apply chamber of the on-coming clutch is filled with fluid, a torque phase during which the torque capacity of the off-going clutching device is reduced and the torque capacity of the on-coming clutching device is increased, and an inertia phase during which the turbine is accelerated to a new velocity determined according to the new speed ratio. Such phases are defined in terms of times $t_0$–$t_4$ for a typical 2-3 upshift in graphs A–D of FIG. 2, each of the graphs having a common time base. Graph A depicts the turbine speed $N_t$; Graph B depicts the pressure command for the on-coming clutching device fluid valve; Graph C depicts the engine torque $T_e$ and the torque carried by the clutching devices 30 and 32; and Graph D depicts the transmission output torque $T_o$.

Prior to the shift activity, the relation between the turbine and output speeds $N_t$ and $N_o$ is static and determined according to the second speed ratio. In addition, the output torque $T_o$ is substantially constant. In the course of the shift, the speed and torque relationships become dynamic as the engine torque $T_e$ is shifted from the clutching device 30 to the clutching device 32. Following the shift activity, the output torque is once again substantially constant, and the relation between $N_t$ and $N_o$ is determined according to the third speed ratio.

At time $t_0$ when it is determined that a 2-3 ratio shift is desired, the solenoid coil 250 of fluid valve 184 is energized at a duty cycle of 100% to commence filling the apply chamber of clutching device 32. This marks the beginning of the fill phase of the shift, as indicated below Graph D. Although not shown in FIG. 2, the solenoid coil 252 of fluid valve 186 is energized at a relatively high duty cycle during the fill phase to maintain engagement of the second speed ratio. At time $t_1$, $t_{fill}$ seconds after time $t_0$, the fluid pressure in the apply chamber of clutching device 32 is sufficiently great to compress the clutch return spring, marking the end of the fill phase and the beginning of the torque phase, as indicated below Graph D. Thereafter, the pressure command is reduced to a value corresponding to an empirically derived initial pressure $P_x$ and progressively increased to a value corresponding to an empirically derived final pressure $P_y$. During such time, the torque $T_{cd32}$ carried by the on-coming clutching device 32 progressively increases and the torque $T_{cd30}$ carried by the off-going clutching device 30 progressively decreases, as seen in Graph C. The output torque $T_o$ in this interval is determined according to the sum of $T_{cd30}$ and $T_{cd32}$ as reflected through the respective speed ratios of transmission 14, and progressively decreases as seen in Graph D. At time $t_2$, the torque $T_{cd32}$ equals the engine torque $T_e$, the torque $T_{cd30}$ is reduced to zero, and the output torque $T_o$ begins to rise with $T_{cd32}$ as seen in Graphs C–D. After time $t_2$, the torque $T_{cd32}$ continues to rise and the torque differential between it and the engine torque $T_e$ urges the turbine to decelerate toward the third ratio speed, designated by the trace 308 in Graph A. At time $t_3$, the turbine speed $N_t$ begins to decrease, marking the end of the torque phase and the beginning of the inertia phase as indicated below Graph D. As the turbine speed $N_t$ decreases, the engine torque $T_e$ increases, as seen in Graph C. At time $t_4$, the turbine speed joins the third speed trace 308, marking the end of the inertia phase and the shift as indicated below Graph D. Since the clutching device 32 is no longer slipping at such point, the torque $T_{cd32}$ drops to the level of the engine torque $T_e$, and the output torque $T_o$ drops to the post-shift level. The shaded area 309 between the $T_e$ and $T_{cd32}$ traces in Graph C is referred to as the inertia torque and represents the amount of torque the on-coming clutching device must exert to effect the speed change.

The on-coming clutch fill time and the clutch pressure schedules are individually determined for each ratio shift. If both are correct, and the various control elements each function as expected, the ratio shift will progress in the desired manner as depicted in FIG. 2, with neither excessive harshness nor excessive slippage of the friction devices. These are the essential ingredients of open loop ratio shifting. As indicated above, however, a certain amount of variation in the engine and transmission operating characteristics can be expected over the life of the vehicle due to wear. Moreover, there may be some vehicle-to-vehicle variability due to assembly and component tolerances. If the on-coming clutching device begins developing torque capacity either before or after the end of the calculated fill time, the exchange of torque capacity between the off-going and on-coming clutching devices will not proceed according to schedule. In this regard, the consequences of overfill and underfill errors are graphically illustrated in FIGS. 3 and 4. Similarly, the shift quality is degraded if the clutch pressure during the torque and inertia phases is too high or too low for a given operating condition. The consequences of improperly low and high pressure scheduling are graphically illustrated in FIGS. 5 and 6.

FIGS. 3–6 each include Graphs A, B, and C corresponding to the Graphs A, C, and D of FIG. 2. To facilitate comparison of the various traces with the corresponding traces of FIG. 2, each of the graphs of FIGS. 3–6 includes the time scale designations $t_0$–$t_4$ as defined in reference to the normal high quality shift of FIG. 2. In addition, the static torque and speed levels shown in FIG. 2 have been adopted in FIGS. 3–6.

Figure 3:
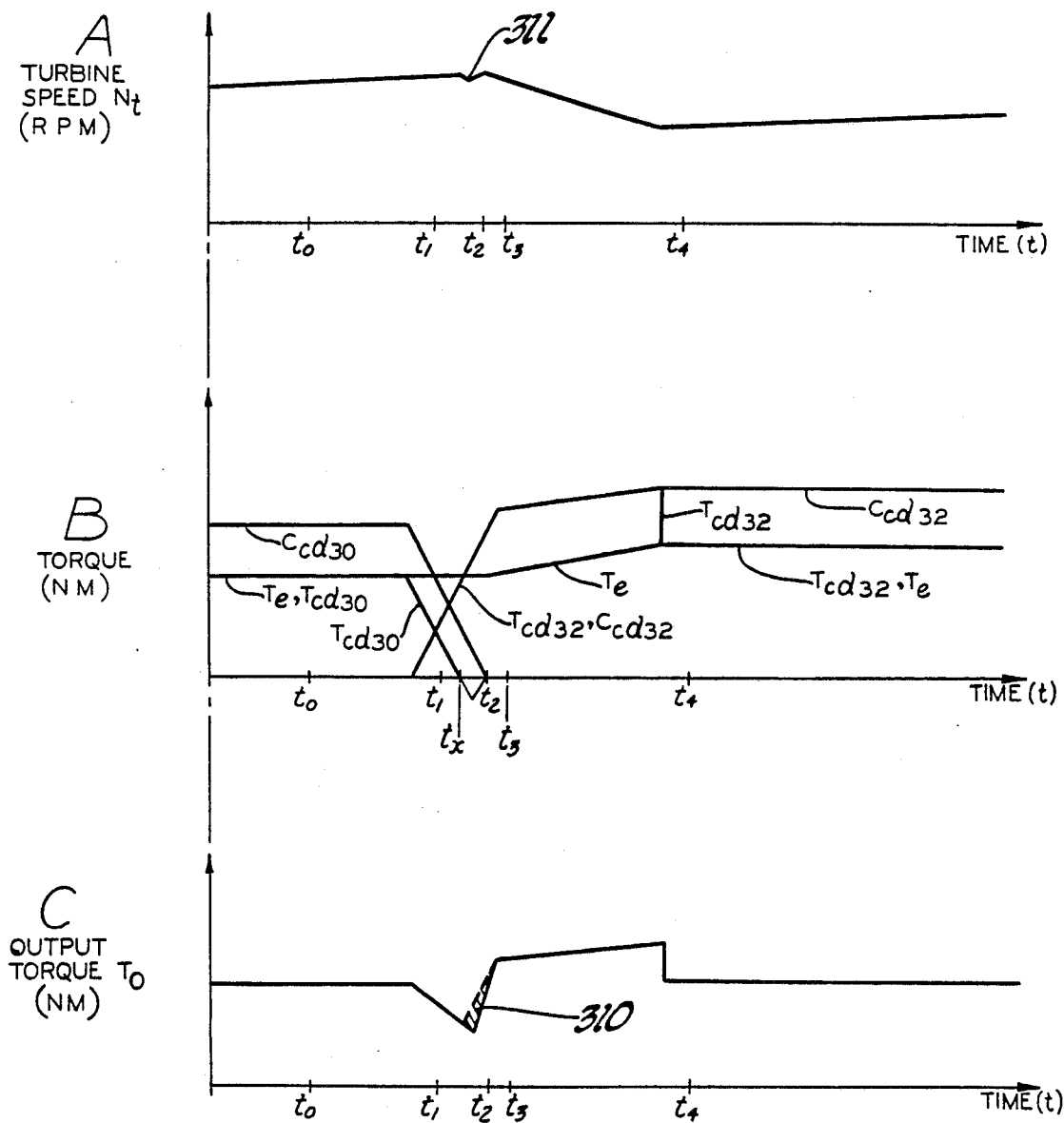

When the stored fill time $t_{fill}$ is too high—FIG. 3—the on-coming clutching device 32 is overfilled, and begins transmitting torque prior to time $t_1$, as seen by the $T_{cd32}$ trace in Graph B. In such case, the capacity $T_{cd32}$ of the on-coming clutching device reaches the engine torque $T_e$ before the capacity $T_{cd30}$ of the off-going clutching device is reduced to zero as seen at time $t_x$ in Graph B. As a result, the on-coming clutching device 32 is opposed by the off-going clutching device 30, resulting in what is known as bind-up, which bind-up reduces the output torque $T_o$ as compared to the shift of FIG. 2. The magnitude of the output torque reduction is graphically represented by the shaded area 310 of Graph C. The bind-up also results in a momentary unwinding of the various transmission and driveline shafts, as evidenced by the momentary reduction 311 in turbine speed $N_t$.

Figure 4:
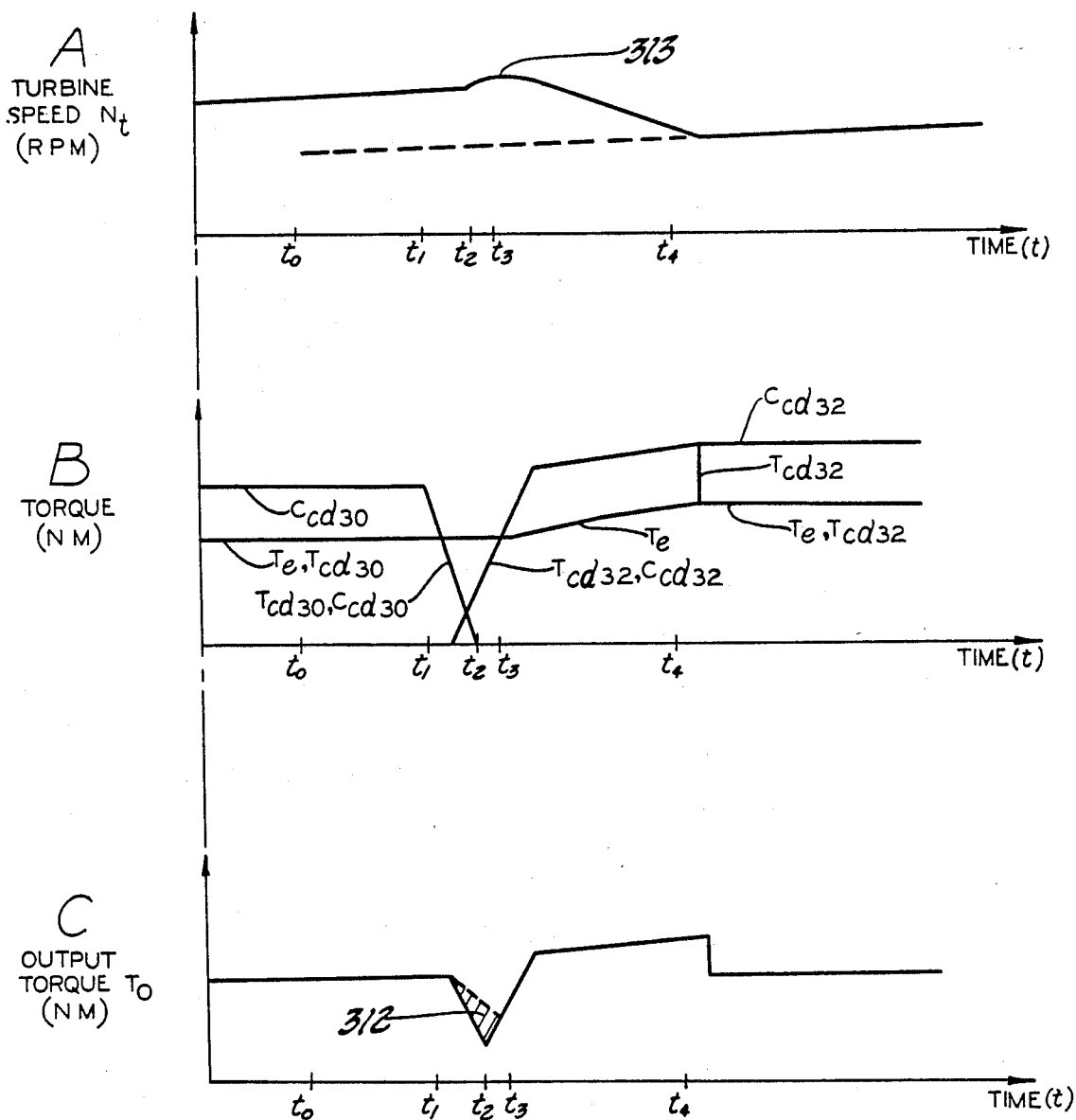

When the stored fill time $t_{fill}$ is too low—FIG. 4—the on-coming clutching device 32 is underfilled, and does not begin transmitting torque until after time $t_1$, as seen by the $T_{cd32}$ trace in Graph B. In such case, the output torque is reduced as compared to the shift depicted in FIG. 2, the amount of such reduction being graphically represented by the shaded area 312 in Graph C. Moreover, the torque capacity $C_{cd32}$ of the on-coming clutching device is not yet sufficient to transmit all of the engine torque $T_e$ when the off-going clutching device is completely released at time $t_2$. This causes a turbine speed flare, as indicated by the reference numeral 313 in Graph A.

Figure 5:
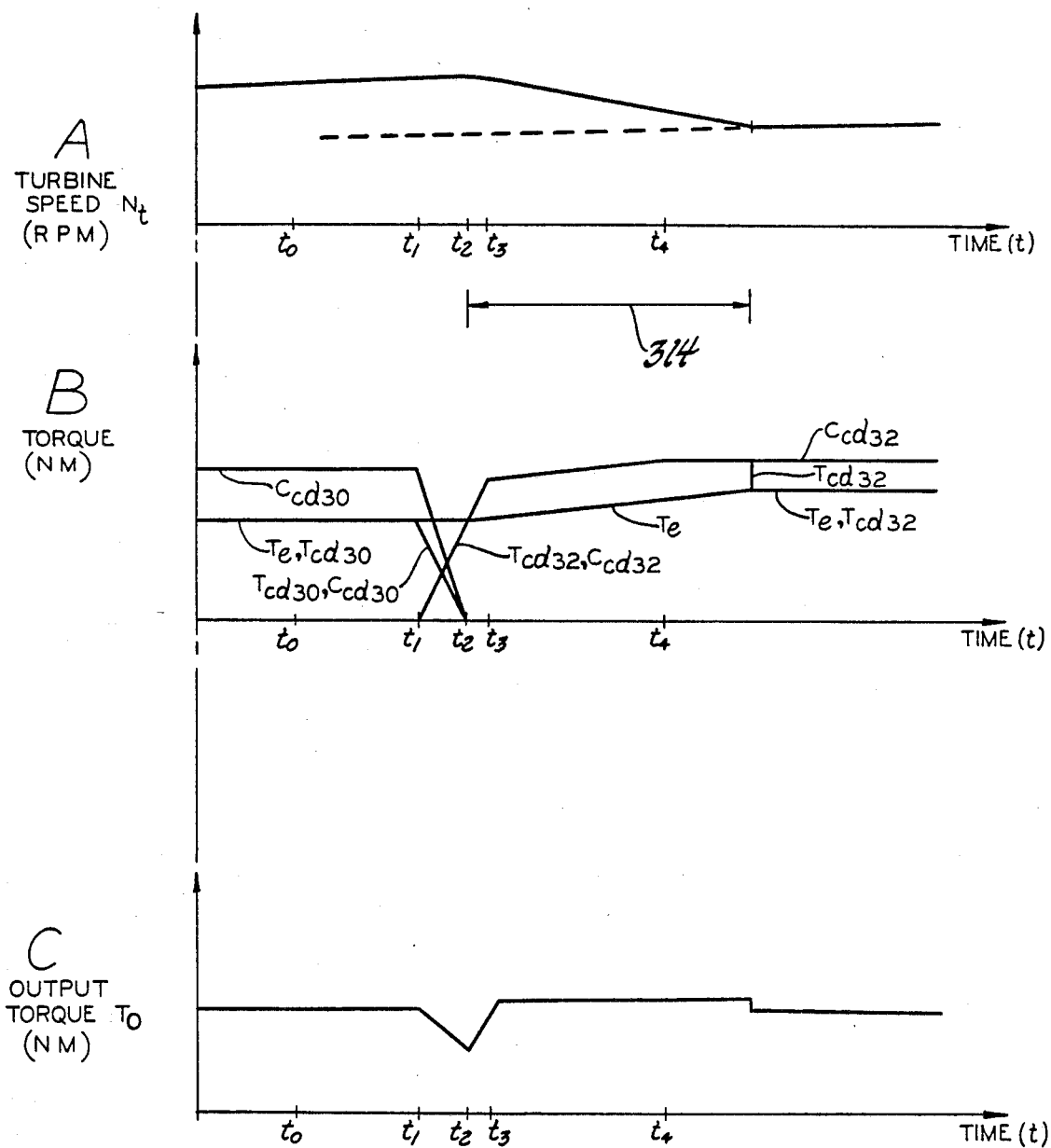

When the scheduled pressure for the on-coming clutching device is too low—FIG. 5—the torque capacity $C_{cd32}$ is reduced as compared to FIG. 2. As a result, the duration of the inertia phase becomes excessively long, degrading the shift quality and inducing excessive wear and heating of the clutching devices. For the example depicted in FIG. 5, the length of the inertia phase is designated by the interval 314.

Figure 6:
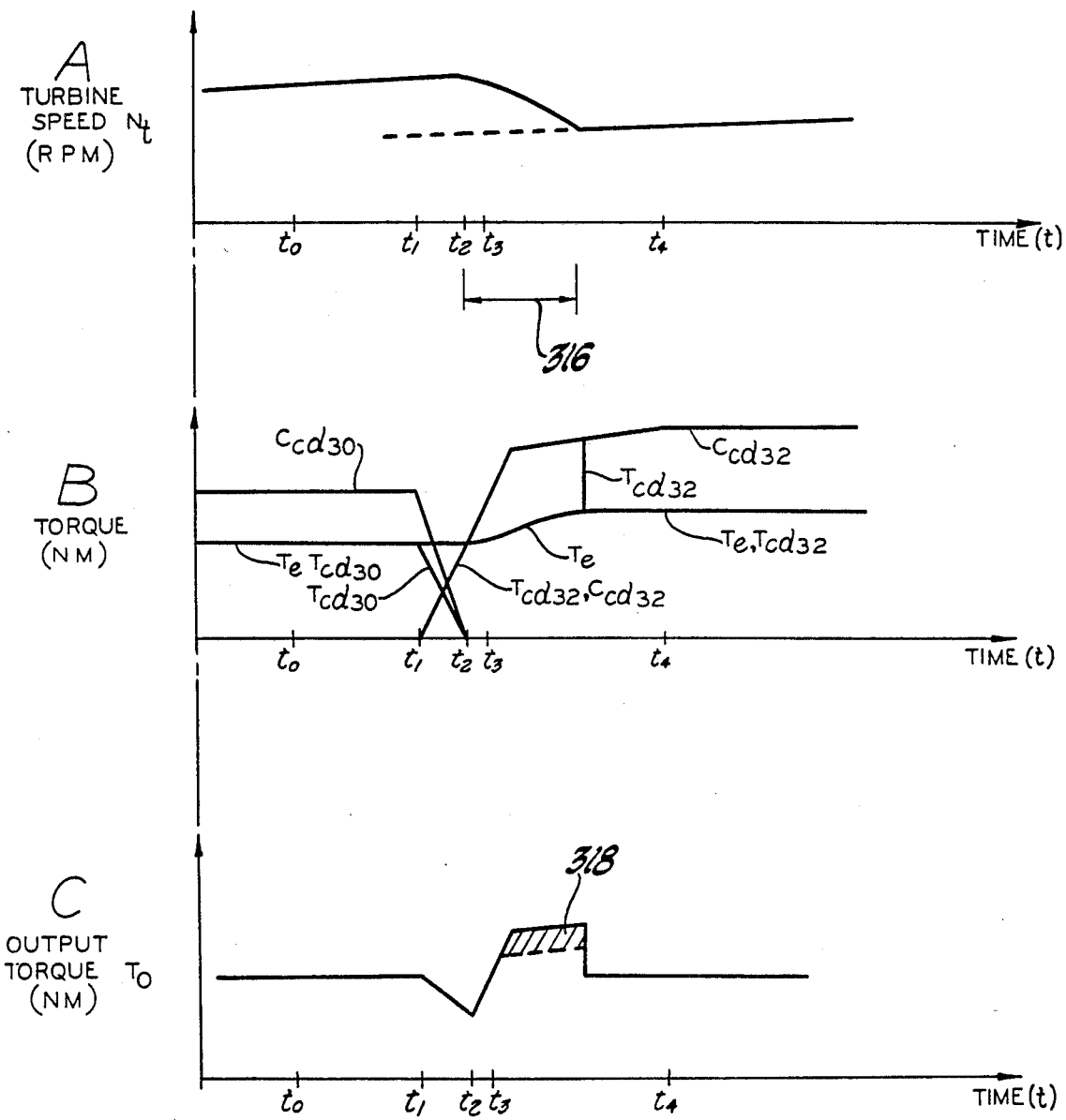

When the scheduled pressure for the on-coming clutching device is too high—FIG. 6—the torque capacity $C_{cd32}$ is increased as compared to FIG. 2, and the turbine is rapidly decelerated to its new speed as seen in Graph A. As a result, the duration of the inertia phase is relatively short, as designated by the interval 316. In addition, the rapid turbine deceleration causes a transient increase in the output torque To as indicated by the shaded area 318 in Graph C, and produces an undesirably harsh shift.

According to this invention, the empirically derived fill times and pressure schedules for the various clutching devices are adaptively compensated in the course of vehicle operation so as to achieve consistent high quality ratio shifting. In each case, specified operating parameters are monitored during each upshift, and then compared to reference parameters to determine if the shift progressed in a desired manner. If the comparison of the monitored and reference parameters indicates that the shift did not progress in the desired manner, the respective fill time and/or pressure schedule is adjusted in a corrective direction so that subsequent shifting will be carried out in a more nearly optimum manner.

The empirically derived fill times are adaptively corrected by monitoring the time interval between the start of fill and the turndown or reduction in turbine speed during each upshift. Since the turbine speed turndown marks the beginning of the inertia phase of the shift, such interval is referred to herein as the inertia phase delay, IPDELAY. The measured IPDELAY is compared to a reference desired delay, DESDELAY, to determine if the on-coming clutching device was properly filled at time $t_1$. If the stored fill time $t_{fill}$ is correct, the on-coming clutching device will be properly filled at time $t_1$, and IPDELAY will be substantially equal to DESDELAY. If the stored fill time $t_{fill}$ is too short and the on-coming clutching device is underfilled at time $t_1$, the turbine speed turndown will be late as shown in FIG. 3, and IPDELAY will be significantly greater than DESDELAY. In this event, the control unit 270 operates to increase the fill time $t_{fill}$ for the respective clutching device so that subsequent shifts involving that clutching device will be performed in a more nearly optimum manner. If the stored fill time $t_{fill}$ is too long and the on-coming clutching device is overfilled (already developing torque capacity) at time $t_1$, the resulting bind-up and momentary turbine speed reduction described in reference to FIG. 4 will be sensed as an early turbine speed turndown, and IPDELAY will be significantly less than DESDELAY. In this event, the control unit 270 operates to decrease the fill time $t_{fill}$ for the respective clutching device so that subsequent shifts involving that clutching device will be carried out in a more nearly optimum manner.

In practice, the turbine speed flare characteristic associated with underfill is more easily identified than the momentary reduction associated with overfill. This is especially true in low torque, high turbine speed shifts since the momentary turbine speed changes associated with overfill are but a small percentage of the steady state turbine speed. This difficulty is overcome according to this invention by periodically decrementing the fill time while the vehicle is being operated under conditions for which overfills cannot be accurately identified. When the incremental changes in fill time result in a detectable underfill, the control unit 270 operates as described above to increase the fill time. In this way, the stored fill times for the various clutching devices are maintained relatively close to the correct values even during periods of vehicle operation for which overfill detection may not be reliable. In addition, large overfill error indications are treated as small overfill indications until several (three, for example) such error indications are successively sensed.

The description of the mechanisms for identifying turndown of turbine speed and for adaptively compensating the clutching device fill times in response thereto is prefaced by a description of the mechanism for computing the fill time. As briefly set forth above, the fill time for a given clutching device is determined primarily as a function of the requested line pressure, the geometry of the clutching device, and the viscosity of the fluid. Algebraically, the fill time $t_{fill}$ is given as follows:

$$t_{fill} = V / [A * (2\Delta P / r)^{\frac{1}{2}}]$$

where V is the volume of the apply chamber, A is the area of the clutch piston, ΔP is the apply pressure less the return spring pressure, and r is the fluid viscosity. To improve the fill time calculation efficiency, this invention defines a fill time vs. pressure (ΔP) function lookup table as graphically depicted by the trace 320 of FIG. 7. The trace 320 takes into account the clutching device geometry and is in the form of an inverse square root function due to the ΔP dependence as set forth in the algebraic expression above. Rather than store the entire function, just the two fill time points (designated L and H) corresponding to the lowest and highest available line pressures $\Delta P_L$ and $\Delta P_H$ are stored by control unit 270. The fill time is linearly interpolated along the broken line 322 connecting the fill time points L and H, and then mathematically adjusted to reflect the inverse square root form $(1/\sqrt{\Delta P})$ of the trace 320. The adjusted fill time is then modified by an oil temperature dependent factor to compensate for variations in the fluid viscosity.

The time required to effect a turndown in turbine speed in the course of an upshift is determined by starting a timer at the end of fill and stopping the timer upon detection of the turndown. The timed interval may thus be viewed as the delay between the end of fill and the beginning of the inertia phase. The turndown is identified by predicting a future turbine speed (through an extrapolation process) and comparing the actual turbine speed with the predicted turbine speed. Turbine speed is detected in terms of T/TP, the time between pulses received from the turbine speed transducer 288 of FIG. 1. By nature of its definition, T/TP varies inversely with turbine speed. The measured values of T/TP are averaged by a first order lag function to determine the average time between turbine pulses, AT/TP. In turn, the difference (AT/TP−T/TP) is computed and subjected to a first order lag function to determine the average change in time between turbine pulses, AΔT/TP. Algebraically, the predicted time between turbine pulses for a point (k+2) seconds in the future, PT/TP(k+2), is given by the expression:

$$PT/TP\ (k+2AT/TP(k) - [AT/TP(k-4) - AT/TP(k)]/2 - [A\Delta T/TP(k-4) + A\Delta T/TP(k)[$$

The term k represents several loop times of control unit 270, and the predicted time between turbine pulses one loop time (L) in the future, PT/TP(L), is determined by linear interpolation between the calculated values. The error time between turbine pulses ET/TP—i.e., the difference between actual and predicted time between turbine pulses T/TP(L) PT/TP(L)—is computed to identify the turndown of turbine speed. Due to the inverse relation between turbine speed and time T, the turndown is identified as a significant error ET/TP of positive sign.

Several steps are taken to minimize the likelihood of false turndown detection. The main concern in this regard is that noise or fluctuation of the turbine speed signal (due to bumps in the road surface, for example) causes some difference between the predicted and actual time between turbine pulses. Primarily, the likelihood of false detection is minimized by the employment of novel signal processing techniques, including (1) enabling the detection algorithm only in a specified time window during the shift, (2) defining a two-stage error threshold for identifying the turndown, and (3) adjusting the two-stage error threshold in accordance with a measure of the turbine speed signal noise. The time window during which the detection algorithm is enabled is defined so that the algorithm is operative to detect the occurrence of turbine speed turndown in worst case overfill and underfill situations. The two-stage error threshold comprises a first relatively low threshold and a second relatively high threshold. When the first threshold is exceeded, the fill timer is sampled. If the second threshold is subsequently exceeded, the occurrence of turndown is confirmed, and turndown indication is given. If the second threshold is not subsequently exceeded, the error is assumed to be noise induced, and the fill timer is permitted to continue counting. In this way, noise induced error is distinguished from turndown induced error. The measure of the turbine speed noise for adjusting the first and second thresholds is obtained by applying a first order lag function to the error signal ET/TP, such filtered signal being identified herein as FET/TP. The thresholds are increased with increasing FET/TP, and decreased with decreasing FET/TP.

In spite of the above signal processing techniques, it is possible that turbine speed noise could cause consecutive significant error signals, and trigger an early turndown indication. The consequence of such a false indication is mitigated (as explained below) by limiting the adaptive correction to a relatively small value until several consecutive overfills have been indicated. In the illustrated embodiment, three consecutive overfill indications are required before a large fill time correction can be issued.

The adaptive compensation mechanism interfaces with the above described fill time determination technique by suitably modifying the fill time endpoints L and H. The amount by which the endpoints L and H are modified is determined in relation to the fill time error ($E_{ft}$) between the detected and expected times to turbine speed downturn. The expected time to turndown is empirically determined in relation to the type of shift and either the working pressure ΔP or the input torque $T_i$. As an example, let it be assumed that the torque phase of a given upshift is expected to take 30 ms. If the actual turbine speed turndown is detected 30 ms after the end of the calculated fill time ($E_{ft}=0$ ms), it is assumed that the calculated fill time is correct and no adaptive compensation is attempted. However, if the turndown is detected 60 ms after the end of the calculated fill time ($E_{ft}=+30$ ms), it is assumed that the calculated fill time is too short—that is, the on-coming clutching device was underfilled and developed torque capacity too late. On the other hand, if the turndown is detected 10 ms after the end of the calculated fill time ($E_{ft}=+-20$ ms), it is assumed that the calculated fill time is too long—that is, the on-coming clutching device was overfilled and developed torque capacity too early. The sign of the error indicates whether the oncoming clutching device was underfilled or overfilled, and the magnitude indicates the amount of error.

The fill time error $E_{ft}$ as defined above is used to determine a fill time correction ($C_{ft}$) for adaptively compensating the stored fill time endpoints L and H as defined in FIG. 7. The fill time correction amount is determined in accordance with a gain scheduling technique designed to achieve fast convergence of the calculated fill times with minimum converged misadjustment. Functionally, the intent is to provide large adjustment when large errors of a given sign are sensed, and little or no adjustment when a distribution of errors are sensed.

The randomness of the system operation is graphically depicted in FIG. 8, where traces 330 and 332 represent typical distributions of sensed fill time error for a clutching device. The distribution trace 330 is centered around zero error, and therefore represents a system which is accurately calibrated and which cannot be improved by adaptive compensation. The shape of the trace is influenced by the control algorithms of control unit 270 and the physical control elements of transmission 14. Presumably, such algorithms and elements are designed to provide a sufficiently high level of repeatability so that acceptable shift quality is achieved within most, if not all of the distribution range. That is, for the example depicted in FIG. 8, a fill time error of plus or minus $e_1$ would not result in unacceptable shift quality. The distribution trace 332 is centered around an error value $e_2$, and therefore represents a system which is not accurately calibrated and which could be improved by adaptive compensation. Nearly all of the fill time errors within the randomness of the distribution trace 332 are greater than $e_1$, and would likely result in unacceptable shift quality.

The aim of adaptive compensation is to move the distribution trace 332 to the left as viewed in FIG. 8 by the amount of $e_2$ so as to achieve the shift quality associated with the distribution trace 330. However, the control unit 270 cannot determine the center of the error distribution based on a given error measurement. For example, a measured error of $e_1$ could occur with a system represented by the distribution trace 330, a system represented by the distribution trace 332, or a system represented by any distribution trace therebetween. If the distribution trace 332 is representative of the system, a relatively large adaptive modification of the fill time would be proper. If the distribution trace 330 is representative of the system, an adaptive modification of the fill time would be a misadjustment.

The difficulty set forth above is overcome according to this invention by establishing a nonlinear base gain schedule which is relatively low for achieving relatively low converged misadjustment and a nonlinear direction sensitive dynamic gain modifier for increasing the base schedule gain in relation to the time integral of the measured error. The authority of the dynamic gain modifier is limited by a maximum overall gain which is dependent on the error magnitude, and the modifier is reset to zero when a significant error of the opposite sign is detected. In FIG. 9, the base gain schedule and the maximum overall gain are graphically depicted as a function fill time error $E_{ft}$. The base gain schedule is depicted by the trace 334 and the maximum overall gain is depicted by the trace 336. As indicated above, fill time error that is positive in sign (underfill) produces a positive correction for increasing the fill time endpoints; fill time error that is negative in sign (overfill) produces a negative correction for decreasing the fill time endpoints. The dynamic gain modifier can increase the base gain correction (in either positive or negative sense) up to the maximum overall gain in relation to the integral of error signals in one direction. Graphically, the shaded areas between the traces 334 and 336 represent the authority range of the dynamic gain modifier. In this way, the fill time correction is determined primarily in accordance with the base schedule gain when the error distribution is centered at or near zero error. When the error distribution becomes significantly skewed in either direction, the dynamic gain modifier becomes active and adds to the base gain to achieve fast correction of the error. Essentially, the adaptive corrections become greater with increased detected error and increased time required to correct the error.

The fill time correction $C_{ft}$ is apportioned between the fill time endpoints L and H in accordance with the fluid pressure applied to the on-coming clutching device during the upshift. The mechanization of such apportionment is graphically depicted in FIG. 10, where the trace 340 represents a gain factor $G_L$ for the endpoint L, and the trace 342 represents a gain factor $G_H$ for the endpoint H. After any upshift where a fill time correction $C_{ft}$ is in order, the endpoint L is adjusted by the amount ($C_{ft}*G_L$), and the endpoint H is adjusted by the amount ($C_{ft}*G_H$). In future shifts involving the subject clutching device, the calculated fill time $t_{fill}$ will more correctly reflect the actual time required to fill its apply chamber and stroke the return spring to develop torque capacity. As a result, changing conditions which affect the fill time of the clutching device are fully compensated for over a number of upshifts involving the clutching device.

The empirically derived pressure schedules for the on-coming clutching devices are adaptively corrected by monitoring the inertia phase interval $t_{ip}$ during each upshift and comparing such interval to a reference interval $t_{rip}$. If the stored pressure schedule is correct, the shift will progress in a desired manner, and $t_{ip}$ will be substantially equal to $t_{rip}$. If the stored pressure schedule is too high, the shift will be too harsh, and $t_{ip}$ will be significantly less than $t_{rip}$. In such event the control unit 270 will operate to decrease the stored pressure schedule so that subsequent shifts involving that clutching device will be carried out in a more nearly optimum manner. If the stored pressure schedule is too low, the shift will take too long, and $t_{ip}$ will be significantly greater than $t_{rip}$. In such event, the control unit 270 will operate to increase the stored pressure schedule.

In operation, the pressure schedules are determined as a function of a torque variable $T_v$. The torque variable $T_v$, in turn, is determined as a function of the gear set input torque $T_i$ and the entry turbine speed $N_{te}$, $N_{te}$ being defined as the turbine speed $N_t$ at the end of the fill phase. The entry turbine speed, in combination with predicted turbine speed for the new speed ratio, provides an indication of the inertia torque required to effect the shift. With this information, the clutch pressures are scheduled so that the time required to effect the shift varies in direct relation to $\Delta N_t$, for any value of input torque $T_i$. However, some input torque dependency may be introduced if it is desired to stretch-out or soften off-pattern shifts, such as high speed-low torque upshifts.

The status of the torque converter clutching device 26 also affects the scheduled pressure. If the clutching device 26 is disengaged during the shift, the torque converter 24 effectively isolates the inertia of the engine 12, and the on-coming clutching device must only overcome the turbine inertia. If the clutching device 26 is engaged during the shift, the inertia torque must be significantly greater since both the engine and turbine inertias must be overcome.

In mechanizing the determination of $T_v$, the gear set input torque $T_i$ is calculated as a function of the engine manifold absolute pressure (MAP), the engine pumping efficiency (K), a mechanical friction term ($T_f$), the accessory load torque ($T_L$), and the torque multiplication ratio ($T_c$) of the torque converter 24 according to the following expression:

Ti $T_i = [(MAP \times K) - T_f - T_L] \times T_c$

The engine MAP is determined from the sensor 296, while the efficiency K is stored based on previously determined data. The mechanical friction term $T_f$ is determined as a function of engine speed, and the load torque term $T_L$ is determined by loading indicators. The torque multiplication ratio $T_c$ is determined as a function of the speed ratio $N_t/N_e$.

The desired pressures for the on-coming and off-going clutching devices are stored as a function of the torque variable $T_v$ and time, as graphically depicted in FIG. 11. For any given value of torque variable $T_v$, the $\Delta P$ vs. time schedule is defined by a pair of pressure endpoints, one such endpoint corresponding to an initial time $t_i$, and the other corresponding to a final time $t_f$. The time $t_i$ marks the beginning of the torque phase, and the time $t_f$ marks the end of the inertia phase. If the calculated torque variable $T_v$ is zero or near-zero, for example, the $\Delta P$ vs. time schedule is defined by the line 350 connecting the pressure endpoints $P_a$ and $P_b$. If the calculated torque variable $T_v$ is very high, as designated by $T_v(max)$, the $\Delta P$ vs. time schedule is defined by the line 352 connecting the pressure endpoints $P_c$ and $P_d$. In practice, only the four pressure endpoints $P_a$, $P_b$, $P_c$, and $P_d$ need be stored by the control unit 270. For any calculated torque variable value $T_{v1}$ between zero and $T_v(max)$, the initial pressure $P_x$ is linearly interpolated along the line 354 connecting the initial pressure endpoints $P_a$ and $P_c$, and the final pressure $P_y$ linearly interpolated along the line 356 connecting the final pressure endpoints P and $P_d$. In such case, the $\Delta P$ vs. time schedule for the shift would be defined by the line 358 connecting the initial and final pressures $P_x$ and $P_y$. The time ($t_f - t_i$) for a given shift is empirically derived and stored in the memory of control unit 270. It should be understood, of course that the pressure schedules may be defined by three or more pressure endpoints if desired using the techniques described herein.

Although the pressure control algorithm set forth above provides good results in a well calibrated system, it is recognized herein that adaptive compensation is needed to correct for variations in system performance which affect the inertia phase torque. According to this invention, the pressure schedule of FIG. 11 is adaptively compensated by developing a reference inertia phase interval $t_{rip}$ and comparing it to a measure of the actual inertia phase interval $t_{ip}$. If the comparison indicates that $t_{ip}$ is too long, the pressure schedule is corrected upward; if the comparison indicates that $t_{ip}$ is too short, the pressure schedule is corrected downward. If the scheduled clutch pressures are developed to result in constant shift time for a given entry turbine speed $N_{et}$ as described above, the reference interval $t_{rip}$ is determined solely in relation to the entry turbine speed $N_{te}$. If some input torque dependency is included to soften the off-pattern shifts as mentioned above, the reference interval $t_{rip}$ is determined as function of both $T_i$ and $N_{te}$.

The actual inertia phase interval $t_{ip}$ is determined in the course of each upshift by monitoring the speed ratio $N_t/N_o$. The initial and final ratios are known, and the control unit 270 continuously computes the percent of ratio completion, % RAT. Algebraically, $RAT is given by the expression:

$$\% RAT = |RAT_{meas} - RAT_{old}| / |Rat_{new} - RAT_{old}|$$

where $RAT_{meas}$ is the actual ratio, $RAT_{old}$ is the ratio of the previously engaged speed ratio, and $RAT_{new}$ is the ratio of the desired speed ratio. The speed ratio for a typical 2-3 ratio shift is graphically represented by the trace 360 of FIG. 12. In such example, the ratio changes from the second speed ratio value of 1.273 RPM/RPM to the third speed ratio value of 0.808 RPM/RPM. Technically, the inertia phase of the shift begins at time $t_0$ when the turbine speed (and hence, the ratio) begins to change, and ends at time $t_3$ when the ratio reaches the third speed ratio value of 0.808 RPM/RPM. However, the initial and final nonlinearity of the trace makes measurement of the interval $t_0$–$t_3$ somewhat difficult. To obtain a more repeatable indication of the inertia phase interval $t_{ip}$ and to permit reliable extrapolation of the available data, $t_{ip}$ is defined as the interval between 20% and 80% of ratio completion. In the example of FIG. 12, the ratio change is 20% complete (1.180 RPM/RPM) at time $t_1$ and 80% complete (0.901 RPM/RPM) at time $t_2$.

When a significant difference between the measured inertia phase interval $t_{ip}$ and the reference inertia phase interval $t_{rip}$ is detected, the control unit 270 develops a pressure correction amount $C_p$ as a function of such difference and apportions the correction amount $C_p$ among the four stored pressure endpoints $P_a$, $P_b$, $P_c$, and $P_d$ defined in FIG. 11. The pressure correction amount $C_p$ is determined in a manner similar to that described above in reference to the fill time correction amount $C_{ft}$. That is, a nonlinear base gain schedule and direction sensitive dynamic gain modifier similar to that as described above in reference to FIG. 9 is used.

The pressure correction amount $C_p$ is apportioned among the stored pressure endpoints $P_a$, $P_b$, $P_c$, and $P_d$ as a function of the torque variable $T_v$ used to schedule the shift. One portion of the correction amount $C_p$ is applied equally to the endpoints $P_a$ and $P_b$, and the remaining portion is applied equally to the endpoints $P_c$ and $P_d$. The apportionment is performed in a manner similar to that of the fill time correction amount $C_{ft}$ (described above in reference to FIG. 10) by developing a gain term $G_L$ for the endpoints $P_a$ and $P_b$, and a gain term $G_H$ for the endpoints $P_c$ and $P_d$. The endpoints $P_a$ and $P_b$ are adjusted by the amount $(C_p*G_L)$, and the endpoints $P_c$ and $P_d$ are adjusted by the amount $(C_p*G_H)$ When the torque variable $T_v$ is relatively low, most of the correction amount $C_p$ will be applied to the endpoints $P_a$ and $P_b$. When the torque variable $T_v$ is relatively high, most of the correction amount $C_p$ will be applied to the endpoints $P_c$ and $P_d$. Due to the adaptive correction, changing conditions which affect the inertia phase interval are compensated for after a number of such upshifts.

The flow diagrams depicted in FIGS. 13-17 represent program instructions to be executed by the microcomputer 302 of control unit 270 in mechanizing ratio shifting and the adaptive control functions of this invention. The flow diagram of FIG. 13 represents a main or executive program which calls various subroutines for executing particular control functions as necessary. The flow diagrams of FIGS. 14-17 represent the functions performed by those subroutines which are pertinent to the present invention.

Referring now more particularly to FIG. 13, the reference numeral 370 designates a set of program instructions executed at the initiation of each period of vehicle operation for initializing the various registers, timers, etc. used in carrying out the control functions of this invention. Following such initialization, the instruction blocks 372-384 are repeatedly executed in sequence as designated by the flow diagram lines connecting such instruction blocks and the return line 386. Instruction block 372 reads and conditions the various input signals applied to I/O device 300 via the lines 272-284, and updates (increments) the various control unit timers. Instruction block 374 calculates various terms used in the control algorithms, including the input torque $T_i$, the torque variable $T_v$, and the speed ratio $N_o/N_i$. The algebraic expressions used to calculate the terms $T_i$ and $T_v$ are given above in reference to FIG. 11. Instruction block 376 determines the desired speed ratio, $R_{des}$, in accordance with a number of inputs including throttle position, vehicle speed, and manual valve position. In transmission control, this function is generally referred to as shift pattern generation. Instruction block 378 determines the clutching device pressure commands for effecting a ratio shift, if required. The pressure commands for the pressure regulator valve PRV and non-shifting clutching devices are also determined. An expanded description of the instruction block 378 is set forth below in reference to the flow diagrams of FIGS. 14-15. Instruction block 380 converts the clutching device and PRV pressure commands to a PWM duty cycle based on the operating characteristics of the various actuators (empirically determined), and energizes the actuator coils accordingly. Instruction block 382 relates to the determination of adaptive corrections for the empirically derived clutch pressure schedules, and is discussed in more detail below in reference to FIG. 17. Instruction block 384 relates to the determination of adaptive corrections for the empirically derived clutch fill times, and is discussed in more detail below in reference to FIGS. 16a-16c.

As indicated above, the flow diagrams of FIGS. 14 and 15 set forth the clutch and PRV pressure determination algorithm generally referred to at the main loop instruction block 378 of FIG. 13. On entering such algorithm, the blocks designated generally by the reference numeral 388 are executed to set up initial conditions if a shift is in order. If a shift is in order, the blocks designated generally by the reference numeral 390 are executed to develop pressure commands for the clutching devices involved in the shift. Thereafter, the instruction blocks 392 and 394 are executed to develop pressure commands for the non-shifting clutches and the pressure regulator valve PRV, completing the routine. As indicated at instruction block 394, the pressure command for the regulator valve PRV is set equal to the highest of the pressure commands for the various clutching devices.

The blocks designated by the reference numeral 388 include the decision block 396 for determining if a shift is in progress as indicated by the "SHIFT IN PROGRESS" flag; the decision block 398 for determining if the actual speed ratio $R_{act}$ (that is, $N_o/N_i$) is equal to the desired speed ratio $R_{des}$ determined at instruction block 376 of FIG. 13; and the instruction block 400 for setting up the initial conditions for a ratio shift. The instruction block 400 is only executed when decision blocks 396 and 398 are both answered in the negative. In such case, instruction block 400 serves to set the old ratio variable, $R_{old}$, equal to $R_{act}$, to set the "SHIFT IN PROGRESS" flag, clear the shift timers, and to calculate the fill time $t_{fill}$ for the on-coming clutching device. If a shift is in progress, the execution of blocks 398 and 400 is skipped, as indicated by the flow diagram line 402. If no shift is in progress, and decision block 398 is answered in the affirmative, the execution of instruction block 400 and the blocks designated by the reference numeral 390 is skipped, as indicated by the flow diagram line 404.

The blocks designated by the reference numeral 390 include the decision block 406 for determining if the shift is an upshift or a downshift; the instruction block 408 for developing pressure commands for the active (shifting) clutching devices if the shift is an upshift; and the instruction block 410 for developing the pressure commands for the active clutching devices if the shift is a downshift. To illustrate how such pressure commands are developed, the steps involved in the development of a typical power-on upshift (i.e., instruction block 408) are set forth in the flow diagram of FIG. 15.

On entering the flow diagram of FIG. 15, the decision block 412 is first executed to determine if fill phase of the shift is completed, as indicated by the "FILL COMP" flag. If not, the flow diagram branch generally designated by the reference numeral 414 is executed; if so, the flow diagram branch generally designated by the reference numeral 416 is executed.

The flow diagram branch 414 includes a fill initializing routine comprising the blocks 418 and 420, and a fill completion routine comprising the blocks 422 and 424. At the beginning of each shift, the "FILL COMP" flag is not set, and the decision block 418 of the fill initializing routine is executed to determine if the fill phase has started, as indicated by the "FILL START" flag. Initially, the "FILL START" flag is not set, and instruction block 420 is executed to set the energization duty cycle of the on-coming clutching device, DC(ONC), equal to 100%, to set the "FILL START" flag, and to start the FILL TIMER and the adaptive fill timer, AFILL TIMER. Thereafter, decision block 418, is answered in the affirmative, and execution of instruction block 420 is skipped, as indicated by the flow diagram line 426. Decision block 422 of the fill completion routine determines if the count in FILL TIMER is greater than or equal to the fill time $t_{fill}$ determined at instruction block 400 of FIG. 14. If so, instruction block 424 is executed to set DC(ONC) to 0%, to save the entry turbine speed $N_{te}$, and to set the "FILL COMP" flag. If decision block 422 is answered in the negative, the fill phase is incomplete, and execution of the instruction block 424 is skipped, as indicated by the flow diagram line 428.

The flow diagram branch 416 includes a shift initializing routine comprising the blocks 430–436, and a shift completion routine comprising the blocks 438–444. Decision block 430 of the initializing routine determines if the "FILL COMP" flag has just been set, as indicated by the status of the "FIRST FILL" flag. If so, the instruction blocks 432 and 434 are executed to set up the torque and inertia phases of the shift. Instruction block 432 determines the pressure parameters $P_i$, $P_f$, and $t_f$ for the on-coming (ONC) and off-going (OFG) clutching devices. Instruction block 434 calculates the reference inertia phase interval $t_{rip}$ as a function of $N_{te}$, $R_{old}$, and $R_{des}$, starts the timer, IP TIMER, and resets the "FIRST FILL" flag. Thereafter, the decision block 430 is answered in the negative, and the instruction block 436 is executed to calculate the value of the term %RATCOMP for use in the adaptive pressure correction algorithm. In the inertia phase completion routine, the decision blocks 438 and 440 are executed to determine if the count in IP TIMER is at a maximum value, MAX, or if the term %RATCOMP is substantially equal to 100%. If either of the decision blocks 438 or 440 are answered in the affirmative, the shift is complete and instruction block 442 is executed to reset the "SHIFT IN PROGRESS" flag, to set the on-coming duty cycle, DC(ONC), equal to 100%, and to set the off-going duty cycle, DC(OFG), equal to 0%. If both decision blocks 438 and 440 are answered in the negative, the instruction block 444 is executed to determine the on-coming and off-going pressure commands, P(ONC) and P(OFG), as a function of the $P_i$, $P_f$, $t_f$, and IP TIMER values.

The flow diagram of FIGS. 16a–16c represents an algorithm for adaptively correcting the determination of fill time $t_{fill}$ according to this invention. As set forth above in reference to FIGS. 7–10, such algorithm involves the detection of turbine speed turndown in the course of an upshift, the determination of the error $E_{ft}$ between measured and desired inertia phase delays, IPDELAY and DESDELAY, and the application of an error dependent correction amount $C_{ft}$ to the endpoints L and H of the stored $t_{fill}$ vs. $\Delta P$ relationship. Generally, the portions of the flow diagram depicted in FIGS. 16a–16b relate to turndown detection, and the determination of error $E_{ft}$, and the portion depicted in FIG. 16c relates to the application of the correction amount $C_{ft}$ to the endpoints L and H. The flow diagram portions are joined where indicated by the circled numerals 1, 2, and 3.

Referring now more particularly to FIG. 16a, the decision blocks 450–452 refer to initial conditions which must be satisfied before enabling the turndown detection algorithm. The detection algorithm is only enabled if a single ratio upshift is in progress (block 450), and the turndown has not yet been detected (as determined by a "TURNDOWN" flag at block 452). If either condition is not met, execution of the algorithm is skipped as indicated by the flow diagram return line 456.

The turbine speed turndown detection algorithm includes an initializing routine comprising the blocks 458–462, and an end of fill (EOF) identification routine comprising the blocks 464–486. As explained above, the turndown detection involves determining the time between pulses, T/TP, of the turbine speed signal on line 274, and novel signal processing of the measured times. The measurement of T/TP is made with a timer, PULSE TIMER, which is reset (enabled to start counting) each time a turbine speed pulse is identified.

The initializing routine is executed only when the algorithm is first enabled in the course of a shift, as indicated by the "FIRST ENABLED" flag. Once the first turbine pulse is identified by the decision block 460, the instruction block 462 is executed to start the PULSE TIMER and to reset the "FIRST ENABLED" flag. Thereafter, decision block 458 is answered in the negative, and the EOF identification routine is entered.

As with the initializing routine, the EOF identification routine includes a decision block 464 for identifying turbine speed pulses, and an instruction block 466 executed each time a pulse is identified for resetting the PULSE TIMER. Prior to resetting the PULSE TIMER, however, the time per turbine pulse, T/TP, counted by the PULSE TIMER is read and stored. Thereafter, instruction block 468 is executed to compute the average time between turbine pulses, AT/TP; the average change in time between turbine pulses, $A^\Delta$T/TP; the predicted time between turbine pulses, PT/TP(k+2) and between loop, PT/TP(L); the loop error time between turbine pulses, ET/TP(L); and the filtered loop error time between turbine pulses, FET/TP(L). Instruction block 470 is then executed to determine the first and second error thresholds $E_{th}(1)$ and $E_{th}(2)$ as a function of the calculated FET/TP(L).

Thereafter, decision block 472 is executed to determine if the shift has progressed to within 200 ms of the expected end of fill. If not, instruction block 474 is executed to read the AFILL TIMER, and the remainder of the routine is skipped as indicated by the flow diagram line 488. If decision block 472 is answered in the affirmative, the decision blocks 476 and/or 478 are executed to compare the error time ET/TP(L) to the thresholds $E_{th}(1)$ and $E_{th}(2)$ for determining if a turndown has occurred. If the error time ET/TP(L) does not exceed the first threshold $E_{th}(1)$, the instruction block 474 is executed to read the AFILL TIMER, and the remainder of the routine is skipped as indicated by the flow diagram return line 488. If the time error does exceed the first threshold, the decision block 478 is executed to compare the error time to the second threshold $E_{th}(2)$. If the second threshold is exceeded, the turndown detection is assumed valid, and the instruction block 480 is executed to set the "TURNDOWN" flag. If the second threshold is not exceeded, the remainder of the routine is skipped as indicated by the flow diagram line 488.

Once the turbine speed turndown has been detected, the decision block 484 is executed to determine if the shift is suitable for formulation of an adaptive correction. Examples of the indicia used to make such determination include stable throttle position, positive calculated input torque $T_i$, and suitable transmission fluid temperature. If the various parameters are not indicative of a normal pattern shift, the remainder of the algorithm is skipped as indicated by the flow diagram return line 488. If the parameters are indicative of a normal pattern shift, the instruction block 486 is executed to determine the measured inertia phase delay, IPDELAY, the desired inertia phase delay, DESDELAY, and the fill time error, $E_{ft}$. As indicated at instruction block 486, IPDELAY is computed according to the difference between the count in AFILL TIMER and the scheduled $t_{fill}$; DESDELAY is determined as a function of the line pressure command PL and the shift type; and $E_{ft}$ is computed according to the difference (IPDELAY-DESDELAY). As described above, the sign of the fill time error $E_{ft}$ indicates whether the on-coming clutching device was overfilled (negative) or underfilled (positive), and the magnitude indicates amount of error.

To lessen the likelihood of making an erroneous fill time correction due to spurious error, and to prevent unnecessary correction of the fill time due to a pressure scheduling error, the adaptive fill algorithm includes a limiting routine comprising the blocks 490–512.

The blocks 490–498 operate to limit fill time corrections in response to unusually high overfill error by comparing the error term $E_{ft}$ to a negative reference, $-REF$, which corresponds to a severe overfill indication. In the event of a severe overfill indication, the error $E_{ft}$ is limited to a relatively small value, $-E_{sm}$, until three or more of such error indications are determined in succession. A large overfill counter, LG OVF COUNTER, is used to keep track of the number of successive overfill indications. When a severe overfill is indicated (as sensed by decision block 490), the instruction block 492 is executed to increment the LG OVF COUNTER; when a smaller overfill is indicated, instruction block 494 is executed to decrement the LG OVF COUNTER. Until the LG OVF COUNTER is incremented to three or greater (as determined by decision block 496), the instruction block 498 is executed to limit the error Eft to a relatively small overfill indication, $-E_{sm}$. When the LG OVF COUNTER is incremented to three or greater, the limit is no longer effective.

The blocks 500–502 operate in response to large positive inertia phase error $E_{ip}$ (explained below in reference to FIG. 17) to limit positive (underfill) fill time error $E_{ft}$ to a reference small value, $+E_{sm}$. As illustrated in FIG. 6, improperly low pressure scheduling in the torque and inertia phases reduces the torque available for decelerating the turbine and delays the turbine speed turndown. In such case, the late turndown detection may be misinterpreted as an underfill error by the fill time adaptive algorithm, even if the scheduled fill time is correct. To prevent significant correction of the fill time in response to such a misinterpretation, the decision block 500 compares the inertia phase error, $E_{ip}$, to a positive reference, $+REF$, indicative of undesirably low pressure scheduling. If the error $E_{ip}$ exceeds the reference, $+REF$, the instruction block 502 is executed to limit the fill time error $E_{ft}$ to a relatively small positive value, $+E_{sm}$. If the reference $+REF$ is not exceeded, the sensed fill time error $E_{ft}$ is not limited.

The blocks 504–512 operate to limit fill time corrections when the vehicle speed is so high that overfill (bind-up) is difficult to reliably determine. Under such conditions, the normal fill time correction is only permitted if turbine speed flare is sensed, or the fill time error $E_{ft}$ indicates a relatively high underfill. In all other cases, a relatively small overfill error ($-E_{sm}$) is assumed. If the assumed overfill error is actually incorrect, underfill errors will be detected in successive shifting, and the correction will be reversed. The block 504 compares the vehicle speed $N_v$ to a reference high speed indication, $REF_{HI}$. If $N_v$ exceeds $REF_{HI}$, the decision block 506 is executed to determine if turbine speed flare has been detected. If so, the underfill indication is assumed to be reliable, and the error $E_{ft}$ is not limited. If turbine speed flare is not detected, decision block 508 is executed to determine if the fill time error $E_{ft}$ is positive and greater than a relatively high reference value, $+REF$. If so, the instruction block 510 is executed to set the fill time error $E_{ft}$ equal to a moderate positive amount, $+E_{mod}$. If $E_{ft}$ is less than $+REF$, instruction block 512 is executed to set the fill time error $E_{ft}$ equal to the relatively small overfill indication, $-E_{sm}$. If $N_v$ is not in excess of $REF_{HI}$, the execution of blocks 506–512 is skipped as indicated by the flow diagram line 514.

Following the limiting routine, the instruction blocks 516–518 are executed to correct the fill time endpoints L and H in relation to the error $E_{ft}$ and the time integral of $E_{ft}$. The instruction block 516 updates the time integral of $E_{ft}$ and calculates a number of terms including the fill time correction $C_{ft}$, the endpoint gain factors $G_H$ and $G_L$, and the endpoint correction amounts $C_{LEP}$ and $C_{HEP}$. The instruction block 518 applies the endpoint correction amounts $C_{LEP}$ and $C_{HEP}$ to the endpoints L and H, respectively. As described above in reference to FIG. 9, the correction amount $C_{ft}$ is determined as a function of $E_{ft}$ and the time integral of $E_{ft}$. As described above in reference to FIG. 10, the gain factors $G_L$ and $G_H$ are determined as a function of the line pressure command PL, the respective gain factors being multiplied by the correction amount $C_{ft}$ to determine the endpoint correction amounts $C_{LEP}$ and $C_{HEP}$.

The adaptive pressure correction algorithm is depicted by the flow diagram of FIG. 17. As described above, the algorithm comprises the steps of obtaining a measure $t_{ip}$ of the inertia phase interval, comparing $t_{ip}$ to a reference interval $t_{rip}$ to obtain an inertia phase error term $E_{ip}$, and correcting the stored pressure endpoints in relation to $E_{ip}$ and the time integral of $E_{ip}$. The measured interval begins when the ratio shift is 20% complete and ends when the ratio shift is 80% complete, as judged by the term %RATCOMP. The algorithm includes an initializing routine, an interval measurement routine, and a correction routine. The initializing routine comprises the blocks 520–526; the interval measurement routine comprises the blocks 528–542; and the correction routine comprises the blocks 544–546.

In the initializing routine, the decision blocks 520 and 522 are executed to determine if a single ratio upshift is in progress, and if the ratio shift is at least 20% complete, as judged by the term, %RATCOMP. If either of the decision blocks 520 and 522 are answered in the negative, the remainder of the flow diagram is skipped, as indicated by the flow diagram return line 550. When both are answered in the affirmative, the decision block 524 is executed to determine if the IP flag is set. This flag marks the beginning of the measured inertia phase interval, and is set by the instruction block 526 the first time that decision block 524 is executed. Instruction block 526 also serves to start the IP TIMER. Thereafter, instruction block 524 is answered in the negative, and the measurement routine is entered.

In the measurement routine, the decision block 528 is executed to compare the count in the IP TIMER with the reference interval, $t_{rip}$. So long as the count in IP TIMER is less than $t_{rip}$, the blocks 530–534 are executed to stop IP TIMER at 80% completion and to calculate the inertia phase error $E_{ip}$ according to the difference (IP TIMER $- t_{rip}$). However, when the count in IP TIMER exceeds $t_{rip}$, the blocks 536–542 are executed to either (1) set the error $E_{ip}$ at a predetermined large value, $E_{LG}$, if the shift is less than 50% complete, or (2) compute the error $E_{ip}$ in relation to the difference between $t_{rip}$ and a linear extrapolation of the inertia phase time, $t_{ip}$. In the later case, the time $t_{ip}$ is extrapolated from the current values of IP TIMER and %RATCOMP, as indicated at instruction block 540 by the expression:

$$t_{ip} = (IPTIMER * .60)/(\%RATCOMP - .20)$$

Once the inertia phase error $E_{ip}$ is determined, the decision block 542 is executed to determine if the various parameters monitored in the course of the shift are indicative of a normal pattern shift. As described above in reference to the adaptive fill time correction, such parameters include stable throttle position, positive torque, and satisfactory oil temperature throughout the shift. If decision block 542 is answered in the affirmative, an adaptive pressure correction may be reliably made and the correction routine is entered.

In the correction routine, the instruction blocks 544 and 546 are executed to correct the pressure endpoints $P_a$, $P_b$, $P_c$, and $P_d$ in relation to the error $E_{ip}$ and the time integral of $E_{ip}$. The instruction block 544 updates the time integral of $E_{ip}$ and calculates a number of terms including the inertia phase pressure correction $C_{ip}$, the endpoint gain factors $G_H$ and $G_L$, and the endpoint correction amounts $C_{LEP}$ and $C_{HEP}$. Instruction block 546 applies the endpoint correction amounts $C_{LEP}$ and $C_{HEP}$ to the pressure endpoints. As described above in reference to FIG. 9, the correction amount $C_{ip}$ is determined as a function of $E_{ip}$ and the time integral of $E_{ip}$. As described above in reference to FIG. 10, the gain factors $G_L$ and $G_H$ are determined as a function of the torque variable $T_v$, the respective gain factors being multiplied by the correction amount $C_{ip}$ to determine the endpoint correction amounts $C_{LEP}$ and $C_{HEP}$. The endpoint correction amount $C_{LEP}$ is applied to the pressure endpoints $P_a$ and $P_b$, while the endpoint correction amount $C_{HEP}$ is applied to the pressure endpoints $P_c$ and $P_d$. In future shifts, the pressure supplied to the subject clutching device will result in an inertia phase interval more nearly equal to the reference interval $t_{rip}$, and a more nearly optimum quality shift.

While this invention has been described in reference to the illustrated embodiment, it will be understood that various modifications will occur to those skilled in the art, and that systems incorporating such modifications may fall within the scope of this invention which is defined by the appended claims.

The embodiments of the invention in which an exclusive property or privilege is claimed are defined as follows:

1. In a shift control system for a motor vehicle multiple speed ratio automatic transmission having a fluid operated torque establishing device associated with a specified speed ratio and a source of fluid pressure, wherein shifting from a currently engaged speed ratio to said specified speed ratio includes a shift completion phase during which fluid is supplied to the torque establishing device by an open-loop control technique in accordance with a predetermined pressure schedule to initiate and progressively increase the torque transmission therethrough, a method of adaptively correcting the predetermined pressure schedule for sources of error which affect the increase of torque transmission through the torque establishing device during the completion phase and thereby degrade the shift quality, said method comprising the steps of:
   repeatedly computing a measure of the speed ratio progression during the completion phase of the shift as a function of the transmission input and output speeds;

measuring the time interval required for the computed measure of speed ratio progression to change from a first predefined value to a second predefined value, and comparing such measured time interval to a reference time interval representative of the time that would be required to effect such change when the shift quality is not degraded; and adjusting the predetermined pressure schedule in relation to the deviation between the measured and reference time intervals such that the scheduled pressure in subsequent shifts to the specified speed ratio is increased if the measured time interval is significantly longer than the reference time interval and decreased if the measured time interval is significantly shorter than the reference time interval, thereby to improve the shift quality in such subsequent shifts.

2. The method set forth in claim 1, wherein the first and second predefined values represent a portion of the speed ratio progression which is substantially linear with respect to time.

3. The method set forth in claim 1, including the step of:

determining the amount of adjustment of said predetermined pressure schedule in accordance with a first term dependent on the difference between said measured and reference time intervals and a second term dependent on the integral of such difference with respect to time.

4. The method set forth in claim 3, including the step of:

resetting said second term to zero when the difference between said measured and reference time intervals changes sign and has a magnitude in excess of a reference amount.

5. The method set forth in claim 3, including the step of:

limiting the amount of adjustment of said predetermined pressure schedule to a maximum reference determined in relation to the difference between said measured and reference time intervals.

6. In a shift control system for a motor vehicle multiple speed ratio automatic transmission having a fluid operated torque establishing device associated with a specified speed ratio and a source of fluid pressure, wherein shifting from a currently engaged speed ratio to said specified speed ratio includes a shift completion phase during which fluid is supplied to the torque establishing device by an open-loop control technique in accordance with a predetermined pressure schedule to inititate and progressively increase the torque transmission therethrough, a method of adaptively correcting the predetermined pressure schedule for sources of error which affect the increase of torque transmission through the torque establishing device during the completion phase and thereby degrade the shift quality, said method comprising the steps of: p1 repeatedly computing a measure of the speed ratio completion as a function of the transmission input and output speeds;

establishing first and second reference values which define a selected portion of the ratio shift progression;

initiating an elapsed time measurement when the measure of speed ratio completion reaches the first reference value and terminating the elapsed time measurement when the measure of speed ratio completion reaches the second reference value;

developing a time error term in relation to the difference between the elapsed time meansurement and a reference time interval representative of the time that would be required to effect such change when the shift quality is not degraded; and adjusting the predetermined pressure schedule in relation to the time error term such that the scheduled pressure in subsequent shifts to the specified speed ratio is increased if the elapsed time measurement is significantly longer than the reference time interval and decreased if the elapsed time measurement is significantly shorter than the reference time interval, thereby to improve the shift quality in such subsquent shifts.

7. The method set forth in claim 6, including the step of:

identifying the point at which the elapsed time measurement reaches the reference time interval; and thereafter setting the time error term to a predetermined high value if the measure of speed ratio completion is less than a third reference value intermediate said first and second reference values.

8. The method set forth in claim 6, including the step of:

identifying the point at which the elapsed time measurement reaches the reference time interval; and thereafter predicting a future value of the elapsed time measurement as a function of the current value of the elapsed time measurement and the current measure of speed ratio shift progression if the measure of speed ratio shift progression is greater than a third reference value intermediate said first and second reference values.

* * * * *